(12) United States Patent
Horiuchi et al.

(10) Patent No.: US 11,877,304 B2
(45) Date of Patent: *Jan. 16, 2024

(54) BASE STATION, TERMINAL, AND COMMUNICATION METHOD

(71) Applicant: Panasonic Intellectual Property Corporation of America, Torrance, CA (US)

(72) Inventors: Ayako Horiuchi, Kanagawa (JP); Lilei Wang, Beijing (CN); Alexander Golitschek Edler Von Elbwart, Hessen (DE); Masayuki Hoshino, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 215 days.

This patent is subject to a terminal disclaimer.

(21) Appl. No.: 17/394,882

(22) Filed: Aug. 5, 2021

(65) Prior Publication Data

US 2021/0368521 A1 Nov. 25, 2021

Related U.S. Application Data

(63) Continuation of application No. 16/081,761, filed as application No. PCT/CN2016/077803 on Mar. 30, 2016, now Pat. No. 11,122,593.

(51) Int. Cl.
*H04W 72/50* (2023.01)
*H04W 28/04* (2009.01)
(Continued)

(52) U.S. Cl.
CPC ......... *H04W 72/535* (2023.01); *H04W 28/04* (2013.01); *H04W 56/005* (2013.01); *H04W 72/23* (2023.01)

(58) Field of Classification Search
CPC ... H04L 5/1469; H04L 5/0055; H04L 5/0082; H04L 5/0053; H04L 1/1822;
(Continued)

(56) References Cited

U.S. PATENT DOCUMENTS

| 7,764,661 B2 | 7/2010 | Heo et al. |
| 9,265,054 B2 | 2/2016 | Miyauchi |

(Continued)

FOREIGN PATENT DOCUMENTS

| EP | 2 234 298 A1 | 9/2010 |
| JP | 2009-232132 A | 10/2009 |

(Continued)

OTHER PUBLICATIONS

3GPP TS 36.211 V13.0.0, "3rd Generation Partnership Project; Technical Specification Group Radio Access Network; Evolved Universal Terrestrial Radio Access (E-UTRA); Physical channels and modulation (Release 13)," Dec. 2015, 142 pages.

(Continued)

*Primary Examiner* — Chi Ho A Lee
(74) *Attorney, Agent, or Firm* — Seed IP Law Group LLP

(57) ABSTRACT

A base station is disclosed, which is capable of appropriately configuring the timings of data assignment, data transmission and reception, and feedback for a case where the DL and UL sTTI lengths are different from each other. In this base station (100), a transmission section (106) transmits a downlink signal using a first short transmission time interval (sTTI) shortened in length than a TTI and used for downlink; and a reception section (107) receives an uplink signal using a second sTTI shortened in length than the TTI and used for uplink. When the first sTTI is shorter in length than the second sTTI, the reception section (107) receives the uplink signal in the second sTTI positioned after a predetermined interval from the transmission timing of the downlink signal, (Continued)

the predetermined interval being configured based on the length of the first sTTI.

18 Claims, 18 Drawing Sheets

(51) Int. Cl.
*H04W 56/00* (2009.01)
*H04W 72/23* (2023.01)

(58) Field of Classification Search
CPC .... H04L 1/1861; H04L 1/1854; H04W 28/04; H04W 72/23; H04W 72/535; H04W 56/005
See application file for complete search history.

(56) References Cited

U.S. PATENT DOCUMENTS

| | | |
|---|---|---|
| 2011/0053625 A1 | 3/2011 | Ishii et al. |
| 2012/0135773 A1 | 5/2012 | Shen et al. |
| 2014/0133327 A1 | 5/2014 | Miyauchi |
| 2017/0142712 A1* | 5/2017 | Lee ................. H04L 5/0053 |
| 2017/0223702 A1* | 8/2017 | Yin .................. H04L 1/1887 |
| 2017/0332365 A1* | 11/2017 | Lin ................. H04W 72/20 |
| 2017/0332377 A1* | 11/2017 | Tseng .............. H04L 5/0053 |
| 2017/0338988 A1* | 11/2017 | Yin .................. H04L 5/0092 |
| 2018/0167172 A1* | 6/2018 | Hosseini .......... H04W 72/1215 |
| 2019/0098622 A1* | 3/2019 | Lee .................. H04W 72/23 |
| 2019/0124680 A1* | 4/2019 | Li .................... H04L 1/1812 |
| 2019/0173633 A1* | 6/2019 | Kwak ............... H04L 5/0007 |
| 2020/0266934 A1* | 8/2020 | Yang ................. H04L 5/0055 |
| 2022/0100278 A1* | 3/2022 | Sinclair ............ G06F 3/04815 |

FOREIGN PATENT DOCUMENTS

| | | |
|---|---|---|
| WO | 2012/063368 A1 | 5/2012 |
| WO | 2016/040290 A1 | 3/2016 |

OTHER PUBLICATIONS

Extended European Search Report, dated May 15, 2019, for European Application No. 16895871.8-1219 / 3437400, 15 pages.
Huawei, "New SI proposal: Study on Latency reduction techniques for LTE approval," RP-150465 (revision of RP-150309), 3GPP TSG RAN Meeting #67, Agenda Item: 13.1.2, Shanghai, China, Mar. 9-12, 2015, 7 pages.
Huawei, HiSilicon, "Short TTI for DL transmissions," R1-160292, Agenda Item: 7.3.4.2, 3GPP TSG RAN WG1 Meeting #84, St. Julian's, Malta, Feb. 15-19, 2016, 8 pages.
Huawei, HiSilicon, "Short TTI for UL transmissions," R1-160294, Agenda Item: 7.3.4.3, 3GPP TSG RAN WG1 Meeting #84, St. Julian's, Malta, Feb. 15-19, 2016, 5 pages.
International Search Report, dated Dec. 28, 2016, for International Application No. PCT/CN2016/077803, 2 pages.
Nokia Networks et al., "Considerations on shorter TTI for TDD duplex mode," R1-160780, Agenda Item: 7.3.4.4, 3GGP TSG-RAN WG1 Meeting #84, St. Julian's, Malta, Feb. 15-19, 2016, 5 pages.
Partial Supplementary European Search Report, dated Feb. 12, 2019, for corresponding European Application No. 16895871.8-1219 / 3437400, 15 pages.

* cited by examiner

BASE STATION, TERMINAL, AND COMMUNICATION METHOD

BACKGROUND

Technical Field

The present disclosure relates to a base station, a terminal, and a communication method.

Description of the Related Art

In recent years, the development of applications that require delay time reduction (delay critical) has been considered. Examples of such applications that require delay time reduction include autonomous vehicle driving, augmented reality applications in smart glasses, or inter-machine communication.

In 3GPP, in order to develop these applications, latency reduction for reducing the packet data latency has been studied (see Non-Patent Literature 1). In latency reduction, shortening (reducing) the length of a transmission time interval (TTI) (TTI length), which is the time unit for transmission and reception of data, to be a time length between 0.5 msec and one orthogonal frequency division multiplexing (OFDM) symbol has been considered. Note that, the traditional TTI length is 1 msec, which is equal to the unit called "subframe." One subframe is composed of two slots (one slot has 0.5 msec). One slot is composed of seven OFDM symbols for normal cyclic prefix (CP) or of six OFDM symbols for extended CP.

FIG. 1 illustrates an example of shortened TTIs for normal CP. When the TTI length is 0.5 msec (=1 slot), two TTIs are set per msec. When one slot is divided into a TTI composed of four OFDM symbols and a TTI composed of three OFDM symbols, four TTIs are set per msec. When the TTI length is one OFDM symbol, fourteen TTIs are set per msec.

Shortening the TTI length makes it possible to reduce latency for CQI reporting and thus to increase the frequency of CQI reporting, which brings an advantage in that the difference between CQI reporting and actual channel quality is reduced.

CITATION LIST

Non-Patent Literature

NPL 1
RP-150465, "New SI proposal: Study on Latency reduction techniques for LTE," Ericsson, Huawei, March 2015
NPL 2
3GPP TS36.211 V13.0.0, "Physical channels and modulation (Release 13)," December 2015

BRIEF SUMMARY

When the TTI length is shortened, the length of a short TTI (hereinafter, "sTTI") may differ between downlink (DL) and uplink (UL). However, in traditional LTE/LTE Advanced, the TTI length is the same between DL and UL, and the timings of data assignment, data transmission and reception, and feedback are defined in common based on the same TTI length. For this reason, it is necessary to newly define the timings of data assignment, data transmission and reception, and feedback in a case where the DL and UL sTTI lengths are different from each other.

An aspect of this disclosure is to provide a base station, a terminal, and a communication method each capable of appropriately configuring the timings of data assignment, data transmission and reception, and feedback for a case where the sTTI length differs between DL and UL.

A base station according to an aspect of the present disclosure includes: a transmission section that transmits a downlink signal using a first short transmission time interval (sTTI) shortened in length than a TTI and used for downlink; and a reception section that receives an uplink signal using a second sTTI shortened in length than the TTI and used for uplink, in which, when the first sTTI is shorter in length than the second sTTI, the reception section receives the uplink signal in the second sTTI positioned after a predetermined interval from a transmission timing of the downlink signal, the predetermined interval being configured based on the length of the first sTTI.

A terminal according to an aspect of the present disclosure includes: a reception section that receives a downlink signal using a first short transmission time interval (sTTI) shortened in length than a TTI and used for downlink; and a transmission section that transmits an uplink signal using a second sTTI shortened in length than the TTI and used for uplink, in which, when the first sTTI is shorter in length than the second sTTI, the transmission section transmits the uplink signal in the second sTTI positioned after a predetermined interval from a reception timing of the downlink signal, the predetermined interval being configured based on the length of the first sTTI.

A communication method according to an aspect of the present disclosure includes: transmitting a downlink signal using a first short transmission time interval (sTTI) shortened in length than a TTI and used for downlink; and receiving an uplink signal using a second sTTI shortened in length than the TTI and used for uplink, in which, when the first sTTI is shorter in length than the second sTTI, the uplink signal is received in the second sTTI positioned after a predetermined interval from a transmission timing of the downlink signal, the predetermined interval being configured based on the length of the first sTTI.

A communication method according to an aspect of the present disclosure includes: receiving a downlink signal using a first short transmission time interval (sTTI) shortened in length than a TTI and used for downlink; and transmitting an uplink signal using a second sTTI shortened in length than the TTI and used for uplink, in which, when the first sTTI is shorter in length than the second sTTI, the uplink signal is transmitted in the second sTTI positioned after a predetermined interval from a reception timing of the downlink signal, the predetermined interval being configured based on the length of the first sTTI.

Note that the comprehensive or specific aspects mentioned above may be implemented by a system, apparatus, method, integrated circuit, computer program, or recoding medium, or any combination of the system, apparatus, method, integrated circuit, computer program, and recoding medium.

According to an aspect of this disclosure, the timings of data assignment, data transmission and reception, and feedback for a case where the sTTI length differs between UL and DL can be appropriately configured.

The specification and drawings reveal more advantages and effects in an aspect of this disclosure. Such advantages and/or effects are provided by the features disclosed in several embodiments as well as the specification and drawings, but all of them do not have to be necessarily provided in order to obtain one or more identical features.

BRIEF DESCRIPTION OF THE SEVERAL VIEWS OF THE DRAWINGS

FIG. 13A is a diagram illustrating other exemplary transmission and reception timings in DL data assignment according to Embodiment 1 (Operation Example 2-2);

FIG. 13B is a diagram illustrating other exemplary transmission and reception timings in DL data assignment according to Embodiment 1 (Operation Example 2-2);

DESCRIPTION OF EMBODIMENTS

Background to Aspect of the Present Disclosure

The 3GPP uses OFDM in DL and single carrier transmission in UL.

In order to keep single carrier transmission in UL, a reference signal (demodulation reference signal: DMRS) and a data signal (physical uplink shared channel: PUSCH) cannot be mapped to the same symbol, which causes a problem in that the overhead for reference signals increases. In addition, a terminal (user equipment: UE) transmits a signal in UL, so that transmission power per time unit is low as compared with DL in which a base station (eNB) transmits a signal. Accordingly, in UL, UEs need to transmit signals while spreading resources over the time domain to secure desired reception power in the eNB.

Meanwhile, since OFDM is used in DL, frequency multiplexing of a reference signal and a data signal (physical downlink shared channel: PDSCH) is easy, and the introduction of sTTI (shortening of a TTI length) is easy as compared with UL. In addition, the amount of DL traffic is considered large as compared with the amount of UL traffic, and latency reduction is more required in DL.

As described above, in shortening of TTI lengths, the sTTI shorter in length than the sTTI in UL is possibly configured in DL.

In this respect, in an aspect of this disclosure, an object is to appropriately define the transmission and reception timings of data assignment, data, and feedback in a case where the sTTI length differs between DL and UL; particularly, in a case where the sTTI for DL (hereinafter, referred to as "DL sTTI") is shorter in length than the sTTI for UL (hereinafter, referred to as "UL sTTI").

Hereinafter, a detailed description will be given of embodiments of the present disclosure with reference to the drawings.

[Summary of Communication System]

A communication system according to each embodiment of the present disclosure includes base station 100 and terminal 200.

Figure 2:
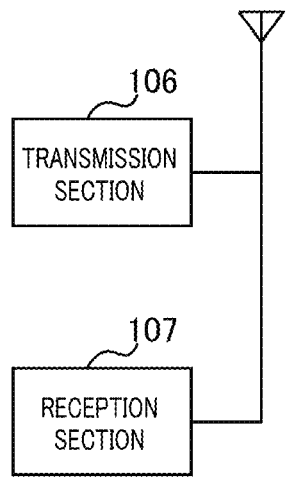
FIG. 2 is a block diagram illustrating a main configuration of a base station according to Embodiment 1.

FIG. 2 is a block diagram illustrating a main configuration of base station 100 according to an embodiment of the present disclosure. In base station 100 illustrated in FIG. 2, transmission section 106 transmits a downlink signal using a first short transmission time interval (sTTI) shortened in length than a TTI and used for downlink (DL sTTI), and reception section 107 receives an uplink signal using a second sTTI shortened in length than the TTI and used for uplink (UL sTTI). When the first sTTI is shorter in length than the second sTTI, reception section 107 receives an uplink signal using the second sTTI positioned after a predetermined interval from a transmission timing of the downlink signal, while the predetermined interval is configured based on the length of the first sTTI (configured using the length of the first sTTI as the basis for configuring the predetermined interval).

Figure 3:
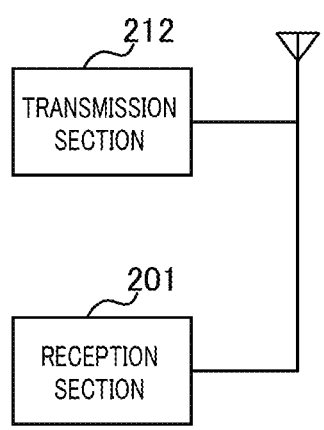
FIG. 3 is a block diagram illustrating a main configuration of a terminal according to Embodiment 1.

FIG. 3 is a block diagram illustrating a main configuration of terminal 200 according to each embodiment of the present disclosure. In terminal 200 illustrated in FIG. 3, reception section 201 receives a downlink signal using a first short transmission time interval (sTTI) shortened in length than a TTI and used for downlink (DL sTTI), and transmission section 212 transmits an uplink signal using a second sTTI shortened in length than the TTI and used for uplink (UL sTTI). When the first sTTI is shorter in length than the second sTTI, transmission section 212 transmits an uplink signal using the second sTTI positioned after a predetermined interval from a reception timing of the downlink signal, while the predetermined interval is configured based on the length of the first sTTI (configured using the length of the first sTTI as the basis for configuring the predetermined interval).

Moreover, hereinafter, a UL data signal and a DL data signal that are assigned using sTTIs (DL sTTI and UL sTTI) are referred to as "sPUSCH" and "sPDSCH," respectively, while a downlink control signal (physical downlink control channel: PDCCH) to which a UL grant or DL assignment is mapped and which is assigned using a DL sTTI is referred to as "sPDCCH."

Embodiment 1

[Configuration of Base Station]

Figure 4:
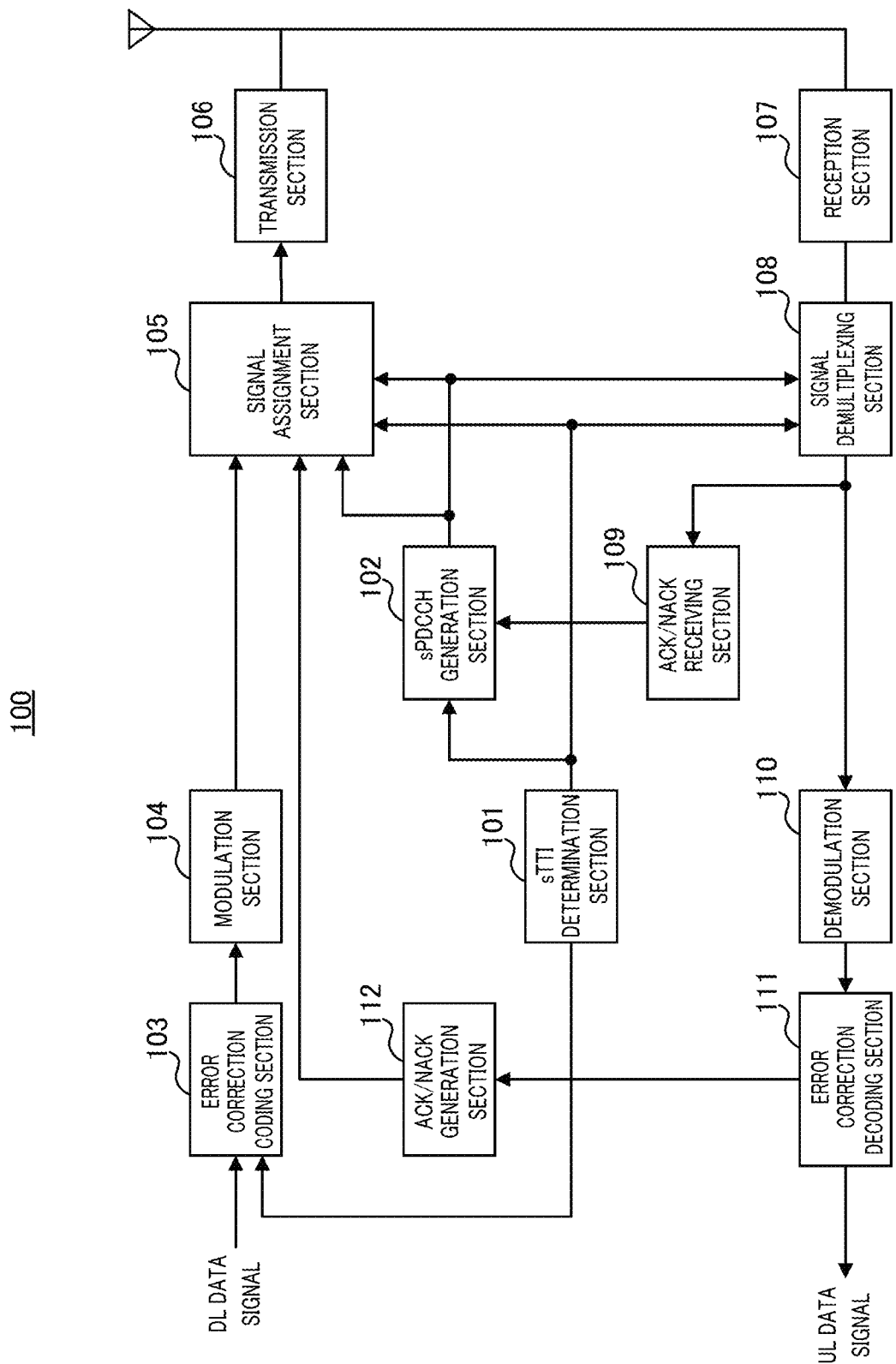
FIG. 4 is a block diagram illustrating a configuration of the base station according to Embodiment 1.

FIG. 4 is a block diagram illustrating a configuration of base station 100 according to Embodiment 1. In FIG. 4, base station 100 includes sTTI determination section 101, sPDCCH generation section 102, error correction coding section 103, modulation section 104, signal assignment section 105, transmission section 106, reception section 107, signal demultiplexing section 108, ACK/NACK receiving section 109, demodulation section 110, error correction decoding section 111, and ACK/NACK generation section 112.

sTTI determination section 101 determines the DL and UL sTTI lengths. sTTI determination section 101 outputs sTTI information that indicates the determined sTTI lengths to sPDCCH generation section 102, signal assignment section 105, and signal demultiplexing section 108. In addition, sTTI determination section 101 outputs the sTTI information to error correction coding section 103 as upper layer signaling.

sPDCCH generation section 102 determines a data size that allows for sTTI transmission and reception on the basis of the sTTI information input from sTTI determination section 101. sPDCCH generation section 102 generates an sPDCCH containing DL or UL resource allocation information (e.g., DL assignment or UL grant). sPDCCH generation section 102 outputs the generated sPDCCH to signal assignment section 105 for transmission to terminal 200. Moreover, sPDCCH generation section 102 outputs the DL resource allocation information to signal assignment section 105 and outputs the UL resource allocation information to signal demultiplexing section 108.

In addition, sPDCCH generation section 102 determines whether retransmission of the DL data signal is necessary on the basis of the content (ACK or NACK) of the ACK/NACK signal input from ACK/NACK receiving section 109 (i.e., ACK/NACK signal for the DL data signal (sPDSCH)) and generates an sPDCCH in accordance with the determination result.

Note that, the transmission and reception timings of data assignment (DL assignment and UL grant), data transmission and reception (PDSCH and PUSCH), and feedback (ACK/NACK signal) in base station 100 will be described in detail, hereinafter.

Error correction coding section 103 performs error correction coding on the transmission data signal (DL data signal) and the upper layer signaling input from sTTI determination section 101 and outputs the coded signal to modulation section 104.

Modulation section 104 applies modulation processing on the signal received from error correction coding section 103 and outputs the modulated signal to signal assignment section 105.

Signal assignment section 105 assigns, to a predetermined downlink resource, on the basis of the sTTI information input from sTTI determination section 101, the signal received from modulation section 103, the control signal (sPDCCH) received from sPDCCH generation section 102, or the ACK/NACK signal (i.e., ACK/NACK signal for the UL data signal (sPUSCH)) received from ACK/NACK generation section 112 The assignment for the control signal (sPDCCH) or data signal (sPDSCH) to the predetermined resource forms a transmission signal. The transmission signal thus formed is output to transmission section 106.

Transmission section 106 applies radio transmission processing such as up-conversion to the transmission signal input from signal assignment section 105 and transmits the processed signal to terminal 200 via an antenna.

Reception section 107 receives the signal transmitted from terminal 200 via an antenna, applies radio reception processing such as down-conversion to the received signal, and outputs the processed signal to signal demultiplexing section 108.

Signal demultiplexing section 108 identifies the reception frequency and temporal timing for the sPUSCH (UL data signal) and ACK/NACK signal on the basis of the UL resource allocation information input from sPDCCH generation section 102 and the sTTI information input from sTTI determination section 101. Signal demultiplexing section 108 demultiplexes the UL data signal from the received signal and outputs the acquired signal to demodulation section 110 while demultiplexling the ACK/NACK signal from the received signal and outputs the acquired signal to ACK/NACK receiving section 109.

ACK/NACK receiving section 109 outputs the content (ACK or NACK) of the ACK/NACK signal for the DL data signal, which is input from signal demultiplexing section 108, to sPDCCH generation section 102.

Demodulation section 110 applies demodulation processing to the signal input from signal demultiplexing section 108 and outputs the signal thus acquired to error correction decoding section 111.

Error correction decoding section 111 decodes the signal input from demodulation section 110 to acquire the received data signal (UL data signal) from terminal 200. Error correction decoding section 111 outputs the UL data signal to ACK/NACK generation section 112.

ACK/NACK generation section 112 detects whether the UL data signal input from error correction decoding section 111 has an error using cyclic redundancy check (CRC) and outputs the detection result to signal assignment section 105 as an ACK/NACK signal.

[Configuration of Terminal]

Figure 5:
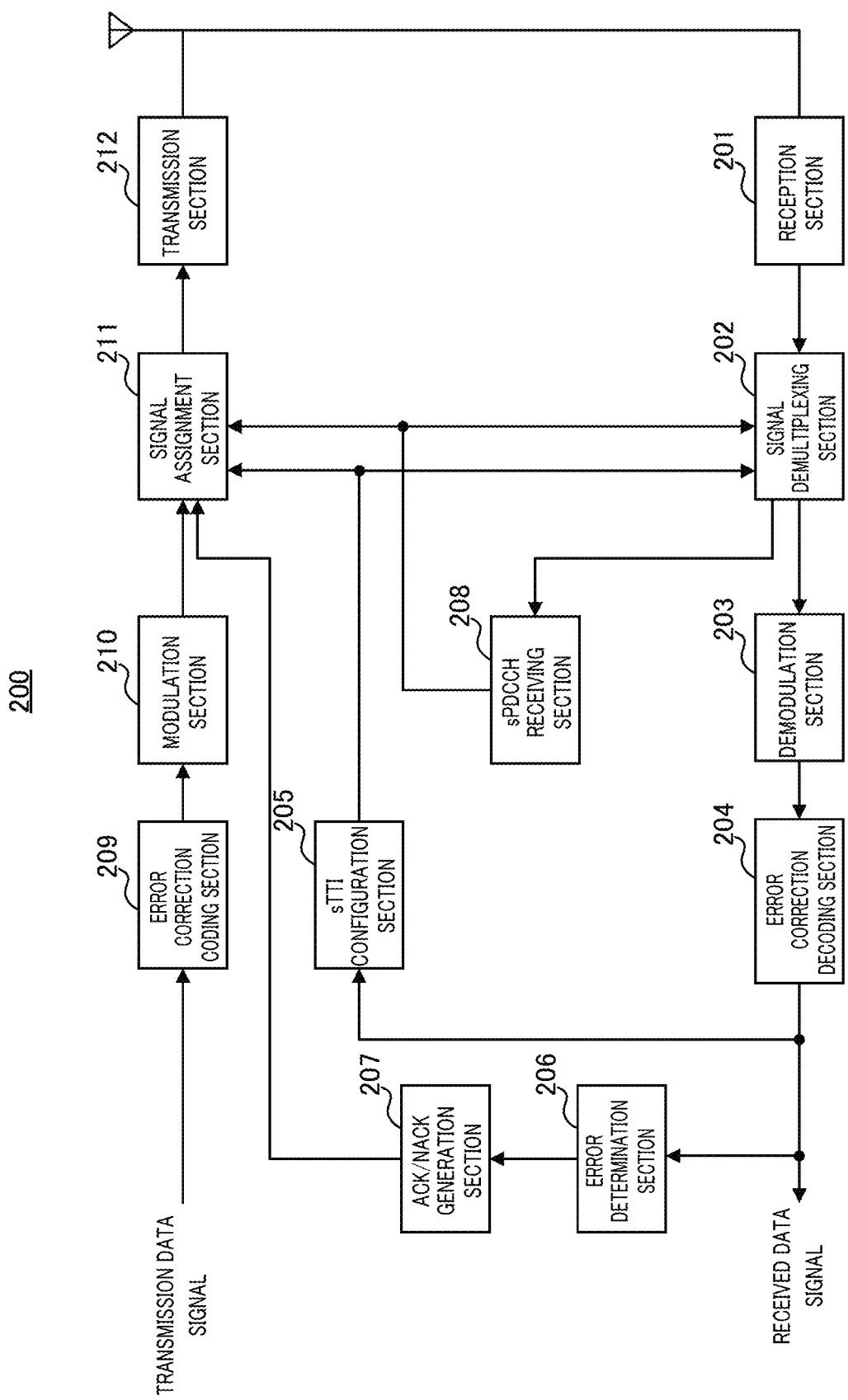
FIG. 5 is a block diagram illustrating a configuration of the terminal according to Embodiment 1.

FIG. 5 is a block diagram illustrating a configuration of terminal 200 according to the present embodiment. In FIG. 5, terminal 200 includes reception section 201, signal demultiplexing section 202, demodulation section 203, error correction decoding section 204, sTTI configuration section 205, error determination section 206, ACK/NACK generation section 207, sPDCCH receiving section 208, error correction coding section 209, modulation section 210, signal assignment section 211, and transmission section 212.

Reception section 201 receives a received signal via an antenna and applies reception processing such as down-conversion to the received signal and outputs the processed signal to signal demultiplexing section 202.

Signal demultiplexing section 202 demultiplexes a signal mapped to a resource to which an sPDCCH is possibly assigned (sPDCCH signal), on the basis of the DL sTTI length input from sTTI configuration section 205, and outputs the acquired signal to sPDCCH receiving section 208. In addition, signal demultiplexing section 202 demultiplexes a DL data signal (sPDSCH) from the received signal on the basis of the DL resource allocation information input from sPDCCH receiving section 208 and outputs the acquired signal to demodulation section 203.

Demodulation section 203 demodulates the signal received from signal demultiplexing section 202 and outputs the demodulated signal to error correction decoding section 204.

Error correction decoding section 204 decodes the demodulation signal received from demodulation section 203 and outputs the acquired received data signal. Moreover, error correction decoding section 204 outputs the received data signal to error determination section 206. In addition, error correction decoding section 204 decodes the demodulation signal received from demodulation section 203 and outputs the upper layer signaling thus acquired (containing the sTTI information) to sTTI configuration section 205.

sTTI configuration section 205 configures the DL and UL sTTI lengths on the basis of the sTTI information input from error correction decoding section 204, then outputs the information indicating the configured DL sTTI length to signal demultiplexing section 202 and outputs the information indicating the configured UL sTTI length to signal assignment section 211.

Error determination section 206 detects whether the received data signal has an error using CRC and outputs the detection result to ACK/NACK generation section 207.

ACK/NACK generation section 207 generates, on the basis of the detection result of the received data signal, which is input from error determination section 206, an ACK when there is no error, or a NACK when there is an error, and outputs the generated ACK/NACK signal to signal assignment section 211.

sPDCCH receiving section 208 extracts resource allocation information (DL resource allocation information and UL resource allocation information) from the sPDCCH received from signal demultiplexing section 202, then outputs the DL resource allocation information to signal demultiplexing section 202 and the UL resource allocation information to signal assignment section 211.

Error correction coding section 209 performs error correction coding on the transmission data signal (UL data signal) and outputs the coded data signal to modulation section 210.

Modulation section 210 modulates the data signal received from error correction coding section 209 and outputs the modulated data signal to signal assignment section 211.

Signal assignment section 211 assigns the data signal input from modulation section 210 to a resource on the basis of the information indicating the UL sTTI length, which is received from sTTI configuration section 205, and the UL resource allocation information received from sPDCCH receiving section 207, and outputs the resultant signal to transmission section 212. In addition, signal assignment section 211 assigns the ACK/NACK signal input from ACK/NACK generation section 207 to an ACK/NACK resource or multiplexes the ACK/NACK signal to the UL data signal and outputs the resultant signal to transmission section 212.

Note that, the transmission and reception timings of data assignment (DL assignment and UL grant), data (PDSCH and PUSCH), and feedback (ACK/NACK signal) in terminal 200 will be described in detail, hereinafter.

Transmission section 212 applies transmission processing such as up-conversion to the signal input from signal assignment section 211 and outputs the processed signal via an antenna.

Moreover, terminal 200 determines whether retransmission of the UL data signal is necessary on the basis of the content (ACK or NACK) of the ACK/NACK signal demultiplexed from the received signal in signal demultiplexing section 202 (i.e., ACK/NACK signal for the UL data signal (sPUSCH)) and retransmits the sPUSCH in accordance with the determination result (not illustrated).

[Operations of Base Station 100 and Terminal 200]

The operations of base station 100 and terminal 200 each configured in the manner described above will be described in detail.

In Embodiment 1, when the DL sTTI and UL sTTI lengths are different from each other and the DL sTTI length is shorter than the UL sTTI length, base station 100 and terminal 200 determine the transmission and reception timings of data assignment (UL grant and DL assignment in sPDCCH), data (sPUSCH and sPDSCH), and feedback (ACK/NACK signal) based on the DL sTTI length.

More specifically, regarding DL data, terminal 200 (transmission section 212) sets the sTTI in which the sPDCCH containing DL assignment is received and the sPDSCH to be assigned by this DL assignment to be same DL sTTI. In addition, terminal 200 transmits an ACK/NACK signal for the sPDSCH in a UL sTTI positioned after a predetermined interval from the timing of the DL sTTI in which the sPDSCH is received (i.e., DL sTTI in which DL assignment is received), while the predetermined interval is configured based on the DL sTTI length. In other words, base station 100 (reception section 107) receives the ACK/NACK signal for the sPDSCH in the UL sTTI positioned after the predetermined interval configured based on the DL sTTI length from the timing of the DL sTTI in which the sPDSCH is transmitted (DL sTTI in which the DL assignment of the sPDSCH is transmitted).

In addition, regarding UL data, terminal 200 (transmission section 212) transmits an sPUSCH in a UL sTTI positioned after a predetermined interval from the reception timing of the sPDCCH containing a UL grant, while the predetermined interval is configured based on the DL sTTI length. In other words, base station 100 (reception section 107) receives the PUSCH in the UL sTTI positioned after the predetermined interval configured based on the DL sTTI length from the transmission timing of the sPDCCH containing the UL grant.

Moreover, base station 100 (transmission section 106) transmits an ACK/NACK signal for an sPUSCH in a DL sTTI positioned after a predetermined interval from the timing of the UL sTTI in which the sPUSCH is received, while the predetermined interval is configured based on the DL sTTI length. In other words, terminal 200 (reception section 201) receives the ACK/NACK signal for the sPUSCH in the DL sTTI positioned after the predetermined interval from the timing of the UL sTTI in which the sPUSCH is transmitted.

When the UL timing determined based on the DL sTTI length does not match the boundary between the UL sTTIs, base station 100 and terminal 200 delay the transmission and reception of a UL signal (sPUSCH or ACK/NACK signal) to the timing that matches the boundary between the UL sTTIs.

For example, base station 100 and terminal 200 define the timings of data assignment, data transmission and reception, and feedback (transmission timing of the second signal with respect to the first signal) as follows:

Timings for DL Data
DL assignment in sPDCCH-sPDSCH: same sTTI
sPDSCH-ACK/NACK feedback: at least after X DL sTTIs Timings for UL Data
UL grant in sPDCCH-sPUSCH: at least after X DL sTTIs sPUSCH-ACK/NACK feedback: at least after X DL sTTIs Note that, the expression "at least after X DL sTTIs" means that at least the interval of (X−1) sTTI(s) is present from completion of transmission and reception of the first signal (the DL assignment, sPDSCH, UL grant or sPUSCH) until start of transmission and reception of the second signal (the sPDSCH, ACK/NACK feedback, sPUSCH or ACK/NACK feedback), and the second signal is assigned to the very first sTTI positioned after the interval (the very first sTTI among the sTTIs positioned after this interval).

Hereinafter, the operations of data assignment, data transmission and reception, and feedback in base station 100 and terminal 200 will be described in detail.

First, an operation example in UL data assignment will be described. In UL data assignment, synchronous HARQ is assumed. Note that, in the following operation example, HARQ process IDs are illustrated for the sake of description, no HARQ process ID is indicated to terminal 200, and the UL sTTI numbers and the HARQ process IDs are associated with each other in base station 100 and terminal 200.

Operation Example 1-1: UL Data Assignment (UL Seven-Symbol sTTIs and DL Three/Four-Symbol sTTIs)

Figure 6:
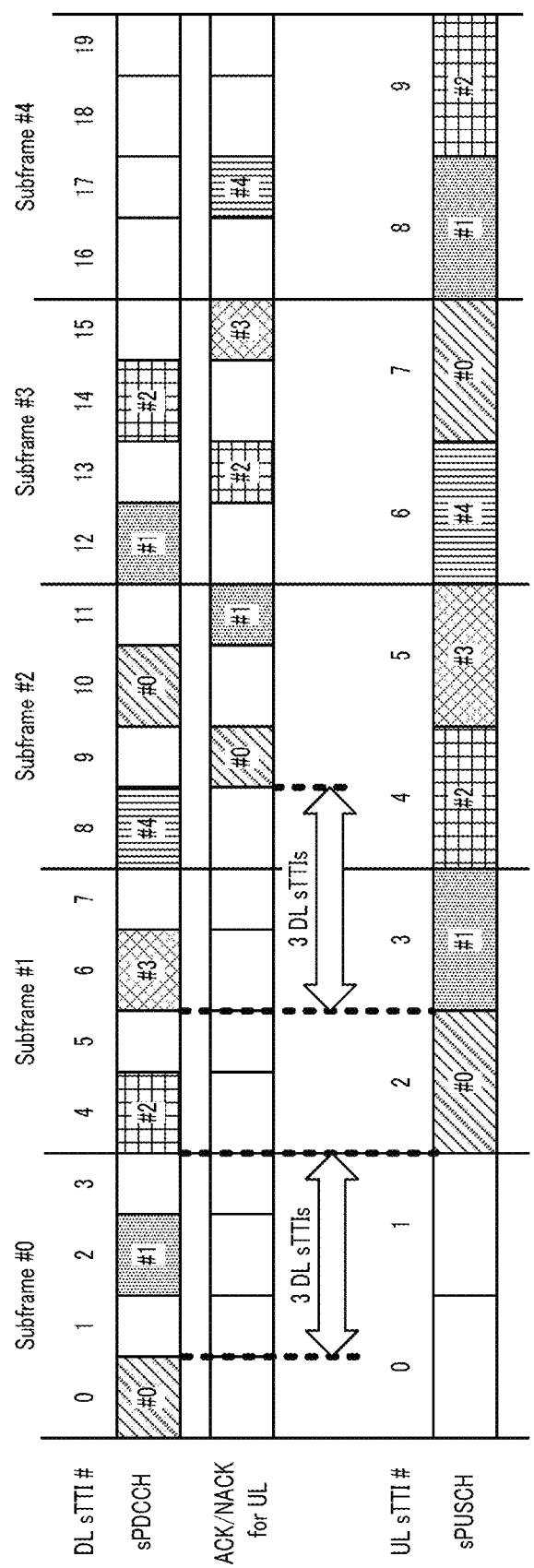
FIG. 6 is a diagram illustrating exemplary transmission and reception timings in UL data assignment according to Embodiment 1 (Operation Example 1-1)

FIG. 6 illustrates exemplary transmission and reception timings of an sPDCCH to which a UL grant indicating transmission of a UL data signal (sPUSCH) is mapped, and an sPUSCH, and transmission and reception timings of an sPUSCH and an ACK/NACK signal for the sPUSCH in Operation Example 1-1.

Figure 1:
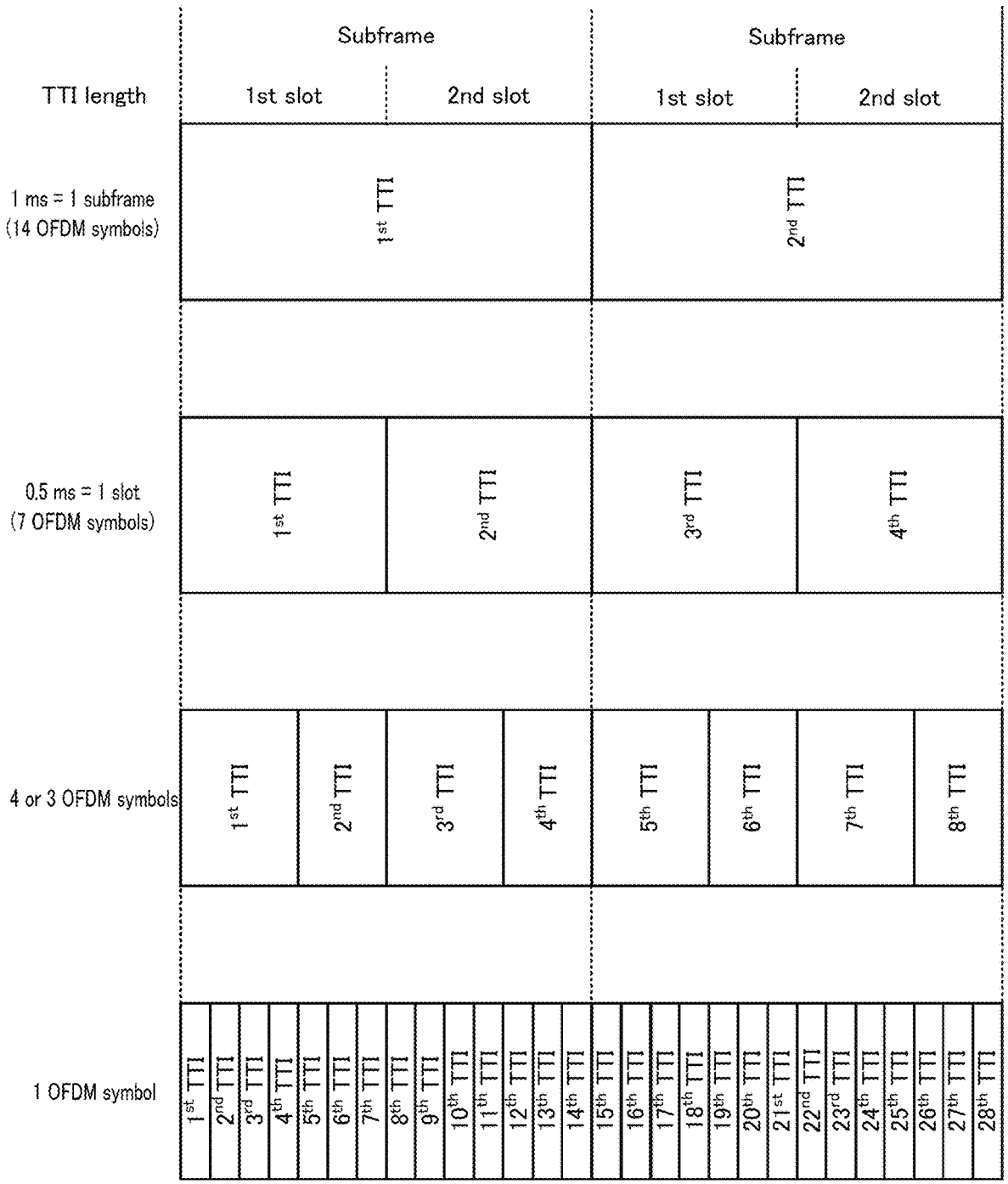
FIG. 1 is a diagram illustrating exemplary TTI lengths.

In Operation Example 1-1, as illustrated in FIG. 6, the UL sTTI length is set to seven symbols, and the DL sTTI length is set to three/four symbols, while X is set equal to 4. Among the three/four-symbol sTTIs, the first-half four symbols and last-half three symbols in one slot form sTTIs, respectively (i.e., two sTTIs in one slot) (e.g., see FIG. 1). More specifically, in FIG. 6, every subframe has four DL sTTIs, and DL sTTIs #0 to #19 are assigned from subframes #0 to #4. Moreover, in FIG. 6, every subframe has two UL sTTIs, and UL sTTIs #0 to #9 are assigned from subframes #0 to #4.

In Operation Example 1-1, the number of DL sTTIs (four DL sTTIs per subframe) is twice the number of UL sTTIs (two UL sTTIs per subframe).

Regarding a UL grant and sPUSCH, when X=4, base station 100 and terminal 200 start transmission and reception of an sPUSCH after at least four DL sTTIs from transmission and reception of a UL grant (sPDCCH) based on the DL sTTI length. More specifically, at least the interval of three (=X−1) DL sTTIs is present from completion of transmission and reception of the UL grant until start of transmission and reception of the sPUSCH. In other words, base station 100 and terminal 200 perform transmission and reception of the sPUSCH in the very first UL sTTI positioned after the interval of three DL sTTIs from the transmission and reception timing of the UL grant.

For example, when base station 100 transmits the UL grant of HARQ process ID #0 in DL sTTI #0, the timing after the interval of three DL sTTIs from the timing of completion of the transmission and reception of the UL grant (DL sTTI #0) is DL sTTI #4. Accordingly, terminal 200 transmits the sPUSCH of HARQ process ID #0 in UL sTTI #2, which is the same timing as DL sTTI #4.

Likewise, regarding an sPUSCH and ACK/NACK signal, when X=4, base station 100 and terminal 200 start transmission and reception of an ACK/NACK signal for the sPUSCH after at least four DL sTTIs from transmission and reception of the sPUSCH based on the DL sTTI length. More specifically, at least the interval of three (=X−1) DL sTTIs is present from completion of transmission and reception of the sPUSCH until start of transmission and reception of the ACK/NACK signal. In other words, base station 100 and terminal 200 perform transmission and reception of the ACK/NACK signal in the very first DL sTTI positioned after the interval of three DL sTTIs from the transmission and reception timing of the sPUSCH.

For example, when terminal 200 transmits the sPUSCH of HARQ process ID #0 in UL sTTI #2, the timing after the interval of three DL sTTIs from the timing of completion of the transmission and reception of the sPUSCH is DL sTTI #9. Accordingly, base station 100 transmits the ACK/NACK signal for the sPUSCH of HARQ process ID #0 in DL sTTI #9.

As described above, when X=4, base station 100 and terminal 200 assign a UL grant and sPUSCH, and an sPUSCH and ACK/NACK signal, while interposing at least three DL sTTIs.

Note that, in FIG. 6, the number of symbols for the interval of three DL sTTIs differs depending on a combination of DL sTTIs forming the interval of three DL sTTIs. More specifically, the interval of three DL sTTIs includes ten OFDM symbols in case of DL sTTIs #1, #2, and #3, but the interval of three DL sTTIs includes eleven OFDM symbols in case of DL sTTIs #6, #7, and #8. This is because a DL sTTI may be composed of four symbols or three symbols.

Moreover, in Operation Example 1-1, a restriction is applied to UL grants so that a UL grant is mapped only to the rearmost DL sTTI at the timing before at least (X−1) DL sTTIs (three DL sTTIs in FIG. 6) from the timing of the boundary between UL sTTIs. With this restriction, as illustrated in FIG. 6, UL grants are mapped to the half of a plurality of DL sTTIs, and no UL grant is mapped to the remaining half thereof. Thus, the possibility of wrongly detecting a UL grant (false alert) can be reduced as compared with the case where terminal 200 monitors a UL grant in all DL sTTIs.

Furthermore, in Operation Example 1-1, the DL sTTIs in which an ACK/NACK signal is transmitted and received are different from the DL sTTIs in which a UL grant is transmitted and received. Accordingly, since the resources used for UL grants are different from the resources used for ACK/NACK signals, the degree of congestion of the resources to which control signals are mapped is advantageously alleviated. Thus, the situation where UL data assignment has to be limited due to a lack of resources for control signals in DL can be avoided.

Next, three different methods (Options 1 to 3) are available for the operation when terminal 200 receives the ACK/NACK signal of HARQ process ID #0 in DL sTTI #9 in FIG. 6.

Option 1: terminal 200 attempts, after reception of an ACK/NACK signal in DL sTTI #9, regardless of whether the ACK/NACK signal is ACK or NACK, detection of a UL grant in DL sTTI #10 in which a UL grant corresponding to the same HARQ process ID #0 is transmitted. When detecting the UL grant in DL sTTI #10, terminal 200 discards the ACK/NACK signal and transmits the sPUSCH in accordance with the indication of the UL grant. Meanwhile, when detecting no UL grant in DL sTTI #10, terminal 200 does not transmit the UL data signal (sPUSCH) of HARQ process ID #0 when the ACK/NACK signal received in DL sTTI #9 is ACK, but transmits the retransmission signal of HARQ process ID #0 in UL sTTI #7 when the ACK/NACK signal received in DL sTTI #9 is NACK.

Option 2: when the ACK/NACK signal received in DL sTTI #9 is ACK, terminal 200 attempts detection of a UL grant in DL sTTI #10 in which the UL grant corresponding to the same HARQ process ID #0 is transmitted. When detecting a UL grant, terminal 200 transmits the sPUSCH in accordance with the indication of the UL grant. Meanwhile, when detecting no UL grant, terminal 200 does not transmit the UL data signal (sPUSCH) of HARQ process ID #0. Moreover, when the ACK/NACK signal received in DL sTTI #9 is NACK, terminal 200 transmits the retransmission signal of HARQ process ID #0 in UL sTTI #7 without performing detection of a UL grant in DL sTTI #10 in which the UL grant corresponding to the same HARQ process ID #0 is transmitted.

Option 3: terminal 200 attempts detection of NACK in DL sTTI #9. When detecting no NACK in DL sTTI #9, terminal 200 attempts detection of a UL grant in DL sTTI #10 in which the UL grant corresponding to the same HARQ process ID #0 is transmitted. When detecting a UL grant in DL sTTI #10, terminal 200 transmits the sPUSCH in accordance with the indication of the UL grant. Meanwhile, when detecting no UL grant in DL sTTI #10, terminal 200 does not transmit the UL data signal (sPUSCH) of HARQ process ID #0. Moreover, when detecting NACK in DL sTTI #9, terminal 200 transmits the retransmission signal of HARQ process ID #0 in UL sTTI #7 without performing detection of a UL grant in DL sTTI #10 in which the UL grant corresponding to the same HARQ process ID #0 is transmitted.

As described above, in Options 1 and 2, an assumption is made that either ACK or NACK is always transmitted as an ACK/NACK signal as in the case of the traditional physical HARQ indicator channel (PHICH), while terminal 200 determines whether the signal indicates ACK or NACK. In Option 3, an assumption is made that an ACK/NACK signal is transmitted only for NACK (error exists) while terminal 200 detects the presence of an ACK/NACK signal.

In Option 1, since terminal 200 always attempts detection of a UL grant, even when ACK is wrongly detected as NACK, transmission of a retransmission signal at a wrong timing can be prevented as long as a UL grant is detected. In Options 2 and 3, since terminal 200 does not perform detection of a UL grant when detecting NACK, the power consumption of terminal 200 can be saved.

Note that, the minimum value for the number of UL HARQ processes is determined from the transmission interval for the sPUSCH of the same UL HARQ process ID. In FIG. 6, the sPUSCH of UL HARQ process ID #0 is transmitted in UL sTTI #2, and the ACK/NACK for the sPUSCH is transmitted in DL sTTI #9. Accordingly, since whether retransmission is necessary is determined in DL sTTI #9, base station 100 can transmit the UL grant of the same UL HARQ process ID #0 in DL sTTI #9 or thereafter. When a UL grant is transmitted in DL sTTI #9 (in DL sTTI #10 in FIG. 10, and will be described in detail, hereinafter) from base station 100, UL sTTI #7 is the very first UL sTTI in which an sPUSCH is transmitted from terminal 200 after the interval of three DL sTTIs. Accordingly, the timing at which the sPUSCH of the same UL HARQ process ID #0 can be transmitted becomes the interval of the five UL sTTIs. When the transmission interval of the same UL HARQ process is five UL sTTIs, five UL HARQ processes can be transmitted in the five UL sTTIs, so that the minimum value for the number of UL HARQ processes can be determined to be five.

Note that, it is also possible to configure a number greater than five to be the number of UL HARQ processes. In this case, since the retransmission interval becomes long, the delay time increases. In addition, when the number of UL HARQ processes increases to a large number, the required buffer increases accordingly, so that the number of UL HARQ processes is desirably configured with the lowest possible value.

Note that, in FIG. 6, base station 100 transmits a UL grant in DL sTTI #10, which is before the interval of three DL sTTIs of UL sTTI #7 without transmitting a UL grant in DL sTTI #9. This is because even when a UL grant is transmitted in DL sTTI #10, there is no impact on the overall delay amount. Note that, the number of UL HARQ processes may be determined previously on the basis of the DL and UL sTTI lengths, and the lowest possible values may be identified and configured for base station 100 and terminal 200, respectively, as described above.

Note that, although attention is given to HARQ process ID #0, herein, the same applies to the other HARQ process IDs #2, #3, and #4.

Operation Example 1-2: UL Data Assignment (UL Three/Four-Symbol sTTIs and DL Two-Symbol sTTIs)

Figure 7:
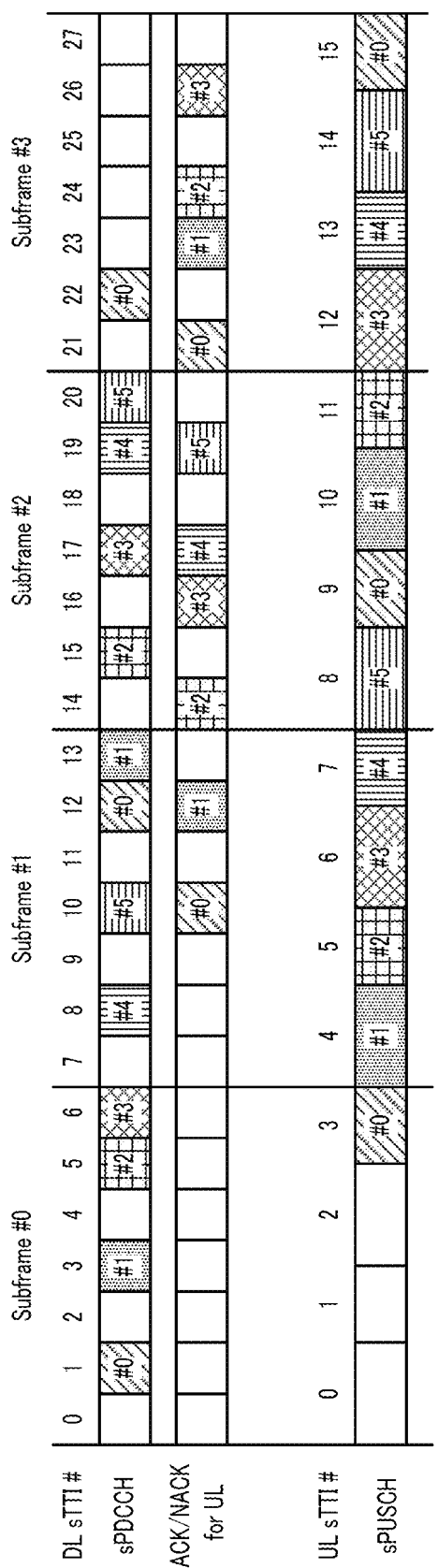
FIG. 7 is a diagram illustrating exemplary transmission and reception timings in UL data assignment according to Embodiment 1 (Operation Example 1-2)

FIG. 7 illustrates exemplary transmission and reception timings of an sPDCCH to which a UL grant indicating transmission of a UL data signal (sPUSCH) is mapped, and an sPUSCH, and transmission and reception timings of an sPUSCH and an ACK/NACK signal for this sPUSCH in Operation Example 1-2.

In Operation Example 1-2, as illustrated in FIG. 7, the UL sTTI length is set to three/four symbols, and the DL sTTI length is set to two symbols, while X is set equal to 4. More specifically, in FIG. 7, every subframe has seven DL sTTIs, and DL sTTIs #0 to #27 are assigned from subframes #0 to #3. Moreover, in FIG. 7, every subframe has four UL sTTIs, and UL sTTIs #0 to #15 are assigned from subframes #0 to #3.

In Operation Example 1-2, the number of DL sTTIs (seven DL sTTIs per subframe) is seven over four (7/4) times of the number of UL sTTIs (four UL sTTIs per subframe).

When X=4, as in Operation Example 1-1, base station 100 and terminal 200 assign a UL grant and sPUSCH, and an sPUSCH and ACK/NACK signal, while interposing at least the interval of three DL sTTIs.

For example, regarding a UL grant and sPUSCH, when base station 100 transmits the UL grant of HARQ process ID #0 in DL sTTI #1, the timing after the interval of three DL sTTIs from the timing of completion of transmission and reception of the UL grant (DL sTTI #1) is DL sTTI #5. Since the timing of DL sTTI #5 does not coincide with the boundary between UL sTTIs, terminal 200 delays the transmission of the sPUSCH until UL sTTI #3, which is the very first UL sTTI positioned rearward the timing of DL sTTI #5, and transmits the sPUSCH of HARQ process ID #0 in UL sTTI #3.

Likewise, regarding an sPUSCH and ACK/NACK signal, when terminal 200 transmits the sPUSCH of HARQ process ID #0 in UL sTTI #3, the timing after the interval of three DL sTTIs from the timing of completion of transmission and reception of the sPUSCH (DL sTTI #6) is DL sTTI #10. Accordingly, base station 100 transmits the ACK/NACK signal for the sPUSCH of HARQ process ID #0 in DL sTTI #10.

In Operation Example 1-2, as in Operation Example 1-1, a restriction is applied to UL grants so that a UL grant is mapped only to the rearmost DL sTTI at the timing before at least (X−1) DL sTTIs (three DL sTTIs in FIG. 7) from the timing of the boundary between UL sTTIs. With this restriction, UL grants are mapped to four DL TTIs of the DL sTTIs within a single subframe, and no UL grant is mapped to the remaining three DL sTTIs as illustrated in FIG. 7. Thus, the possibility of wrongly detecting a UL grant (false alert) can be reduced as compared with the case where terminal 200 monitors a UL grant in all DL sTTIs.

Furthermore, in Operation Example 1-2, as in Operation Example 1-1, the DL sTTIs in which an ACK/NACK signal is transmitted and received are different from the DL sTTIs in which a UL grant is transmitted and received. Accordingly, since the resources used for UL grants are different from the resources used for ACK/NACK signals, the degree of congestion of the resources to which control signals are mapped is advantageously alleviated. Thus, the situation where UL data assignment has to be limited due to a lack of resources for control signals in DL can be avoided.

However, in Operation Example 1-2, unlike Operation Example 1-1, the number of DL sTTIs is seven over four (7/4) times of the number of UL sTTIs, so that it is impossible to map all ACK/NACK signals and UL grants to different DL sTTIs.

In the sTTI mapping of FIG. 7, while neither a UL grant nor ACK/NACK signal is mapped to DL sTTI #11 and DL sTTI #18, both a UL grant and ACK/NACK signal are mapped to DL sTTI #10 and DL sTTI #17.

Figure 8:
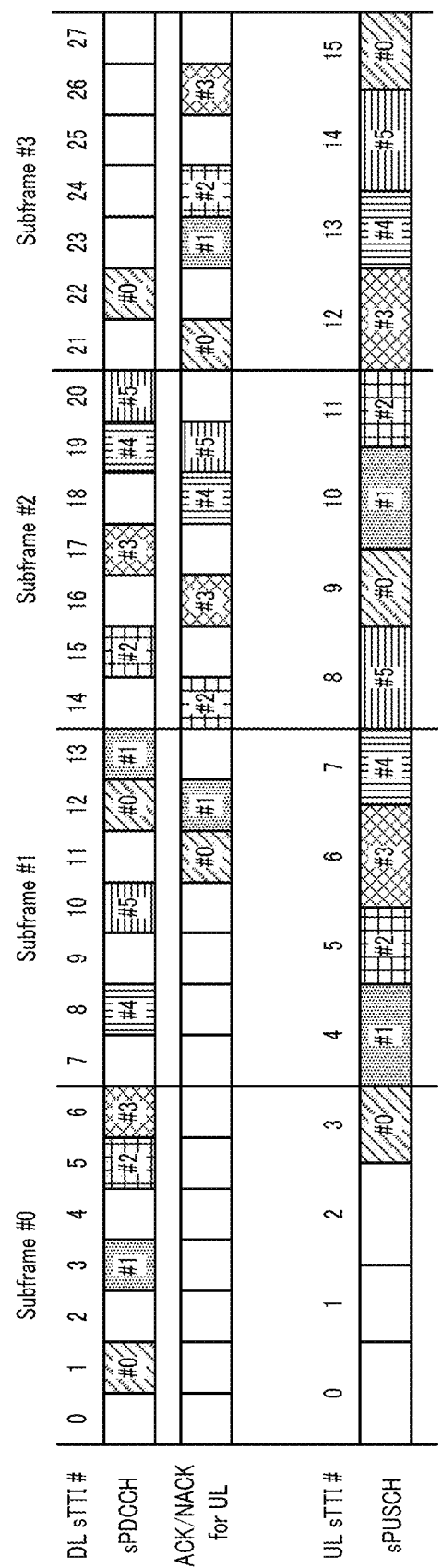
FIG. 8 is a diagram illustrating other exemplary transmission and reception timings in UL data assignment according to Embodiment 1 (Operation Example 1-2)

In this respect, for the purpose of dispersing the control signal resources, base station 100 may make an adjustment to transmit an ACK/NACK signal in a DL sTTI right before the DL sTTI in which the UL grant of the same HARQ process ID as the HARQ process ID of this ACK/NACK signal is transmitted. FIG. 8 illustrates an operation example of adjusting the DL sTTI to which an ACK/NACK signal is mapped.

In FIG. 8, the ACK/NACK signal of HARQ process ID #0 mapped to DL sTTI #10 in FIG. 7 is mapped to DL sTTI #11 right before DL sTTI #12 to which the UL grant of HARQ process ID #0 is mapped. Likewise, in FIG. 8, the ACK/NACK signal of HARQ process ID #4 mapped to DL sTTI #17 in FIG. 7 is mapped to DL sTTI #18 right before DL sTTI #19 to which the UL grant of HARQ process ID #4 is mapped. Thus, the control signals (UL grant and ACK/NACK signal) are mapped dispersedly.

Note that, in terms of delay, mapping of an ACK/NACK signal can be performed with any interval as long as the interval is of three DL sTTIs from the sPUSCH of the same HARQ process ID and the interval is of three DL sTTIs from the next sPUSCH in which retransmission for the same HARQ process ID may be performed. Accordingly, there is no problem in terms of delay even when the ACK/NACK signal of HARQ process ID #0 which has been mapped to DL sTTI #10 is mapped to DL sTTI #11, and the ACK/NACK signal of the HARQ process ID #4 which has been mapped to DL sTTI #17 is mapped to DL sTTI #18.

Delaying an ACK/NACK signal rearward as in FIG. 8 allows base station 100 to determine whether to perform adaptive retransmission or non-adaptive retransmission, on the basis of the state of the scheduling in the rearward, so that the scheduler flexibility of base station 100 can be improved.

Operation Example 1-3: UL Data Assignment (UL Seven-Symbol sTTIs and DL Two-Symbol sTTIs)

Figure 9:
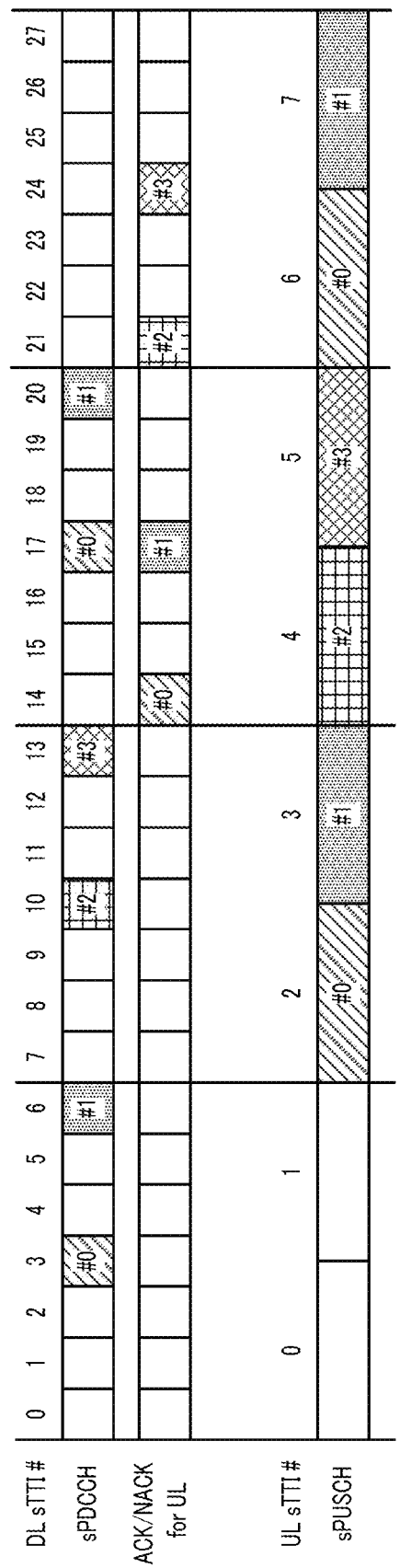
FIG. 9 is a diagram illustrating exemplary transmission and reception timings in UL data assignment according to Embodiment 1 (Operation Example 1-3)

FIG. 9 illustrates exemplary transmission and reception timings of an sPDCCH to which a UL grant indicating transmission of a UL data signal (sPUSCH) is mapped, and an sPUSCH, and transmission and reception timings of an sPUSCH and an ACK/NACK signal for this sPUSCH in Operation Example 1-3.

In Operation Example 1-3, as illustrated in FIG. 9, the UL sTTI length is set to seven symbols, and the DL sTTI length is set to two symbols, while X is set equal to 4. More specifically, in FIG. 9, every subframe has seven DL sTTIs, and DL sTTIs #0 to #27 are assigned from subframes #0 to #3. Moreover, in FIG. 9, every subframe has two UL sTTIs, and UL sTTIs #0 to #7 are assigned from subframes #0 to #3.

In other words, in Operation Example 1-3, the number of DL sTTIs (seven DL sTTIs per subframe) is seven over two (7/2) times of the number of UL sTTIs (two UL sTTIs per subframe).

When X=4, as in Operation Example 1-1, base station 100 and terminal 200 assign a UL grant and sPUSCH, and an sPUSCH and ACK/NACK signal, while interposing at least three DL sTTIs.

For example, regarding a UL grant and sPUSCH, when base station 100 transmits the UL grant of HARQ process ID #0 in DL sTTI #3, the timing after the interval of three DL sTTIs from the timing of completion of transmission and reception of the UL grant (DL sTTI #3) is DL sTTI #7. Terminal 200 transmits the sPUSCH of HARQ process ID #0 in UL sTTI #2, which is the same timing as DL sTTI #7.

Likewise, regarding an sPUSCH and ACK/NACK signal, when terminal 200 transmits the sPUSCH of HARQ process ID #0 in UL sTTI #2, the timing after the interval of three DL sTTIs from the timing of completion of transmission and reception of the sPUSCH (DL sTTI #10) is DL sTTI #14. Accordingly, base station 100 transmits an ACK/NACK signal for the sPUSCH of HARQ process ID #0 in DL sTTI #14.

In Operation Example 1-3, as in Operation Example 1-1, a restriction is applied to UL grants so that a UL grant is mapped only to the rearmost DL sTTI at the timing before at least (X−1) DL sTTIs (three DL sTTIs in FIG. 9) from the timing of the boundary between UL sTTIs. With this restriction, UL grants are mapped to two DL TTIs of the DL sTTIs within a single subframe, and no UL grant is mapped to the remaining five DL sTTIs as illustrated in FIG. 9. Thus, the possibility of wrongly detecting a UL grant (false alert) can be reduced as compared with the case where terminal 200 monitors a UL grant in all DL sTTIs.

Furthermore, in Operation Example 1-3, as in Operation Example 1-1, the DL sTTIs in which an ACK/NACK signal is transmitted and received are different from the DL sTTIs in which a UL grant is transmitted and received. Accordingly, since the resources used for UL grants are different from the resources used for ACK/NACK signals, the degree of congestion of the resources to which control signals are mapped is advantageously alleviated. Thus, the situation where UL data assignment has to be limited due to a lack of resources for control signals in DL can be avoided.

However, in Operation Example 1-3, the number of DL sTTIs is seven over two (7/2) times of the number of UL sTTIs, so that as in Operation Example 2, it is impossible to map all ACK/NACK signals and UL grants to different DL sTTIs.

Figure 10:
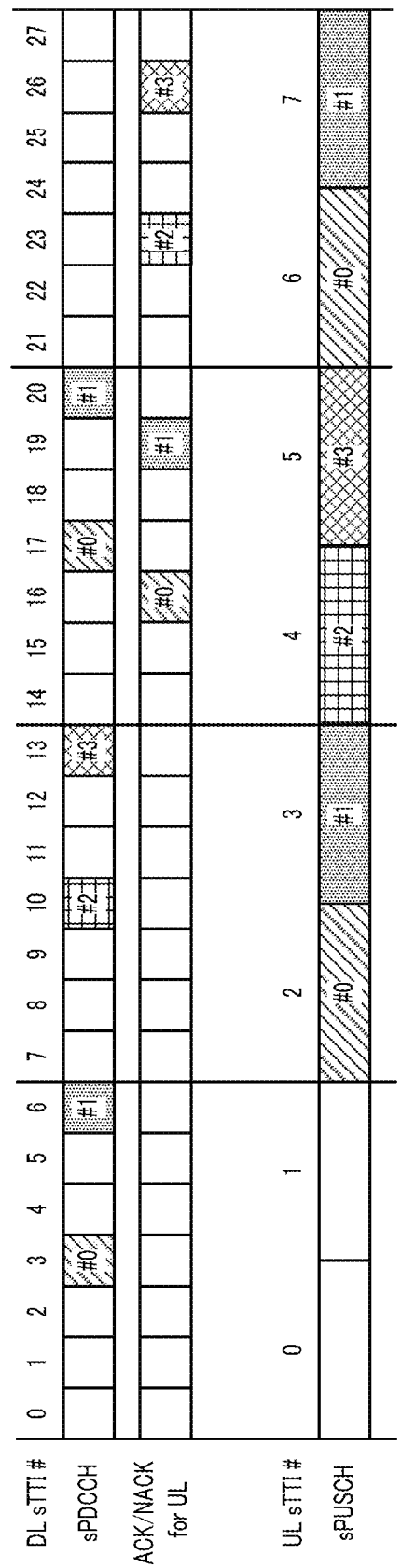
FIG. 10 is a diagram illustrating other exemplary transmission and reception timings in UL data assignment according to Embodiment 1 (Operation Example 1-3)

In this respect, for the purpose of dispersing the control signal resources, base station 100 may make an adjustment to transmit an ACK/NACK signal in a DL sTTI right before the DL sTTI in which the UL grant of the same HARQ process ID as the HARQ process ID of this ACK/NACK signal is transmitted. FIG. 10 illustrates an operation example of adjusting the DL sTTI to which an ACK/NACK signal is mapped.

In FIG. 10, the ACK/NACK signal of HARQ process ID #0 mapped to DL sTTI #14 in FIG. 9 is mapped to DL sTTI #16 (positioned two DL sTTIs rearward DL sTTI #14) right before DL sTTI #17 to which the UL grant of HARQ process ID #0 is mapped. Likewise, in FIG. 10, the ACK/NACK signal of HARQ process ID #1 mapped to DL sTTI #17 in FIG. 9 is mapped to DL sTTI #19 (positioned two DL sTTIs rearward DL sTTI #17) right before DL sTTI #20 to which the UL grant of HARQ process ID #1 is mapped. Thus, the control signals (UL grant and ACK/NACK signal) are mapped dispersedly.

As in Operation Example 1-2, in terms of delay, mapping of an ACK/NACK signal can be performed with any interval as long as the interval is of three DL sTTIs from the sPUSCH of the same HARQ process ID and the interval is of three DL sTTIs from the next sPUSCH in which retransmission for the same HARQ process ID may be performed. Accordingly, there is no problem in terms of delay even when the ACK/NACK signal of HARQ process ID #0 which has been mapped to DL sTTI #14 is mapped to DL sTTI #16, and the ACK/NACK signal of the HARQ process ID #1 which has been mapped to DL sTTI #17 is mapped to DL sTTI #19.

Delaying an ACK/NACK signal rearward as in FIG. 10 allows base station 100 to determine whether to perform adaptive retransmission or non-adaptive retransmission, on the basis of the state of the scheduling in the rearward, so that the scheduler flexibility of base station 100 can be improved.

Operation Examples 1-1, 1-2, and 1-3 in UL data assignment have been described thus far.

Next, a description will be given of operation examples in DL data assignment. Asynchronous HARQ is assumed in DL data assignment. In addition, an HARQ process ID is notified to terminal 200 by DL assignment.

Note that, although the following operation examples will be described with a case where serial HARQ process IDs are assigned to serial DL sTTIs, but are by no means limited to this case.

Operation Example 2-1: UL Data Assignment (UL Seven-Symbol sTTIs and DL Three/Four-Symbol sTTIs)

Figure 11:
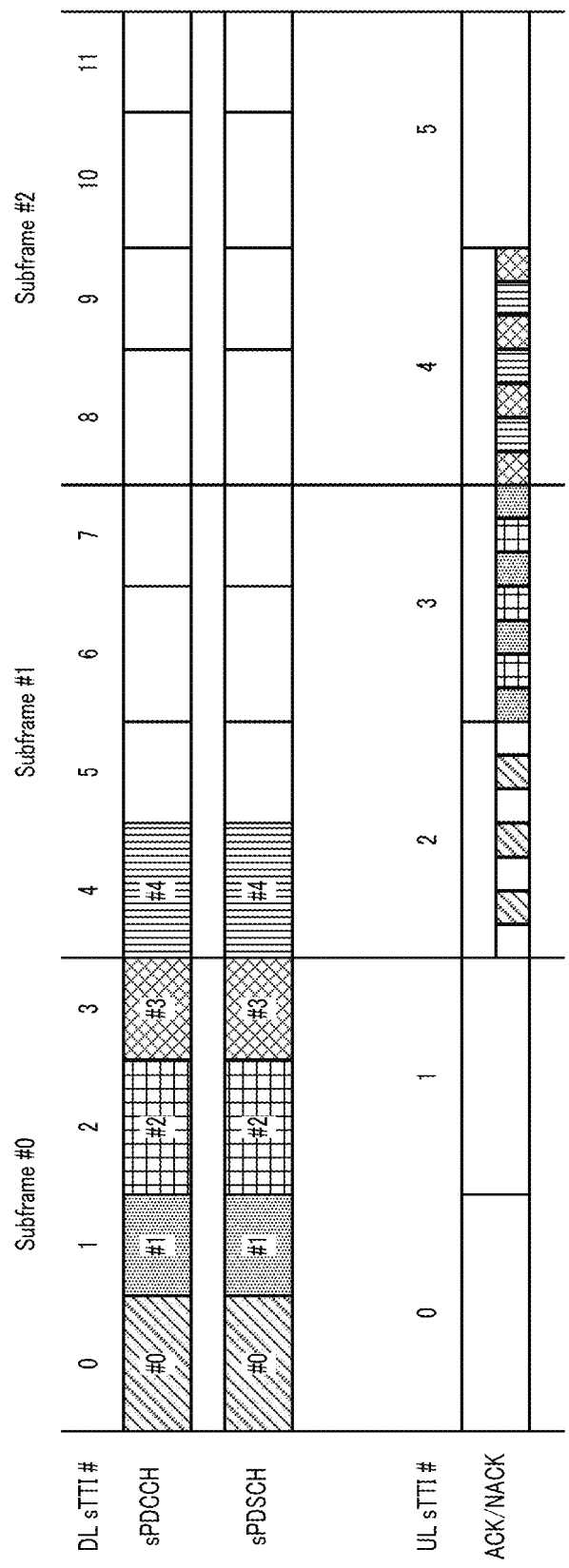
FIG. 11 is a diagram illustrating exemplary transmission and reception timings in DL data assignment according to Embodiment 1 (Operation Example 2-1)

FIG. 11 illustrates exemplary transmission and reception timings of an sPDCCH to which DL assignment indicating transmission of a DL data signal (sPDSCH) is mapped, and an sPDSCH, and transmission and reception timings of an sPDSCH and an ACK/NACK signal for the sPDSCH in Operation Example 2-1.

In Operation Example 2-1, as illustrated in FIG. 11, the UL sTTI length is set to seven symbols, and the DL sTTI length is set to three/four symbols, while X is set equal to 4. More specifically, in FIG. 11, every subframe has four DL sTTIs, and DL sTTIs #0 to #11 are assigned from subframes #0 to #2. Moreover, in FIG. 11, every subframe has two UL sTTIs, and UL sTTIs #0 to #5 are assigned from subframes #0 to #2.

In other words, in Operation Example 2-1, as in Operation Example 1-1, the number of DL sTTIs (four DL sTTIs per subframe) is twice the number of UL sTTIs (two UL sTTIs per subframe).

Regarding DL assignment and sPDSCH, base station 100 transmits an sPDSCH indicated by DL assignment in the same DL sTTI as the DL sTTI in which the DL assignment is transmitted and received. For example, when transmitting the DL assignment of HARQ process ID #0 in DL sTTI #0, base station 100 transmits the sPDSCH in the same DL sTTI #0.

Moreover, regarding an sPDSCH and ACK/NACK signal, when X=4, base station 100 and terminal 200 start transmission and reception of an ACK/NACK signal for the sPDSCH after at least four DL sTTIs from transmission and reception of the sPDSCH based on the DL sTTI length. More specifically, at least the interval of three (=X−1) DL sTTIs is present from completion of transmission and reception of the sPDSCH until start of transmission and reception of the ACK/NACK signal. In other words, base station 100 and terminal 200 perform transmission and reception of an ACK/NACK signal in the very first UL sTTI positioned after the interval of three DL sTTIs from the transmission and reception timing of the sPDSCH.

For example, when base station 100 transmits the sPDSCH of HARQ process ID #0 in DL sTTI #0, the timing after the interval of three DL sTTIs from the timing of completion of the transmission and reception of the sPDSCH (DL sTTI #0) is DL sTTI #4. Accordingly, terminal 200 transmits the ACK/NACK signal for the sPDSCH of HARQ process ID #0 in UL sTTI #2 which is the same timing as DL sTTI #4.

Note that, although attention is given to HARQ process ID #0, herein, the same applies to the other HARQ process IDs #2, #3, and #4.

In FIG. 11, the number of DL sTTIs is twice the number of UL sTTIs, so that terminal 200 transmits, per UL sTTI, two ACK/NACK signals for the sPDSCHs received in two DL sTTIs, respectively. In this case, terminal 200, for example, multiplexes or bundles the plurality of ACK/NACKs and transmits the ACK/NACKs using a UL resource.

In LTE/LTE Advanced, the start position of a UL resource for transmitting an ACK/NACK signal from a UE is indicated by an upper layer parameter called "N1_PUCCH," and the offset amount from the start position can be found from the (E)CCE number.

Meanwhile, in Operation Example 2-1, regarding an sPDSCH and ACK/NACK signal, terminal 200 may identify the transmission position of an ACK/NACK signal from the DL assignment received in a DL sTTI having a large sTTI number (i.e., DL sTTI positioned further rearward) among a plurality of DL sTTIs used in reception of the sPDSCHs for which the corresponding ACK/NACK signals are to be transmitted in the same UL sTTI. This is because the DL sTTIs positioned rearward allows the scheduler to change resource allocation in consideration of ACK/NACK resources afterward, thus improving the scheduler flexibility. For example, in FIG. 11, terminal 200 identifies the transmission position of an ACK/NACK signal from the DL assignment received in the sPDCCH in DL sTTI #2 which has a larger DL sTTI number between DL sTTIs #1 and #2 used in reception of sPDSCHs corresponding to the ACK/NACK signals to be transmitted in UL sTTI #3.

In addition, regarding an sPDSCH and ACK/NACK signal, when actually receiving the sPDSCH in one DL sTTI among a plurality of DL sTTIs used in reception of the sPDSCHs for which the corresponding ACK/NACK signals are to be transmitted in the same UL sTTI, terminal 200 identifies the transmission position of the ACK/NACK signals from the DL assignment received in the DL sTTI.

Note that, the transmission position of an ACK/NACK signal is determined from the shift amount based on the DL sTTI and the shift amount based on the CCE number of DL assignment from N1_PUCCH indicated by the upper layer. The shift amount based on the DL sTTI is assumed to be predetermined. Moreover, N1_PUCCH may be indicated by the upper layer for each DL sTTI.

Operation Example 2-2: DL Data Assignment (UL Three/Four-Symbol sTTIs and DL Two-Symbol sTTIs)

Figure 12:
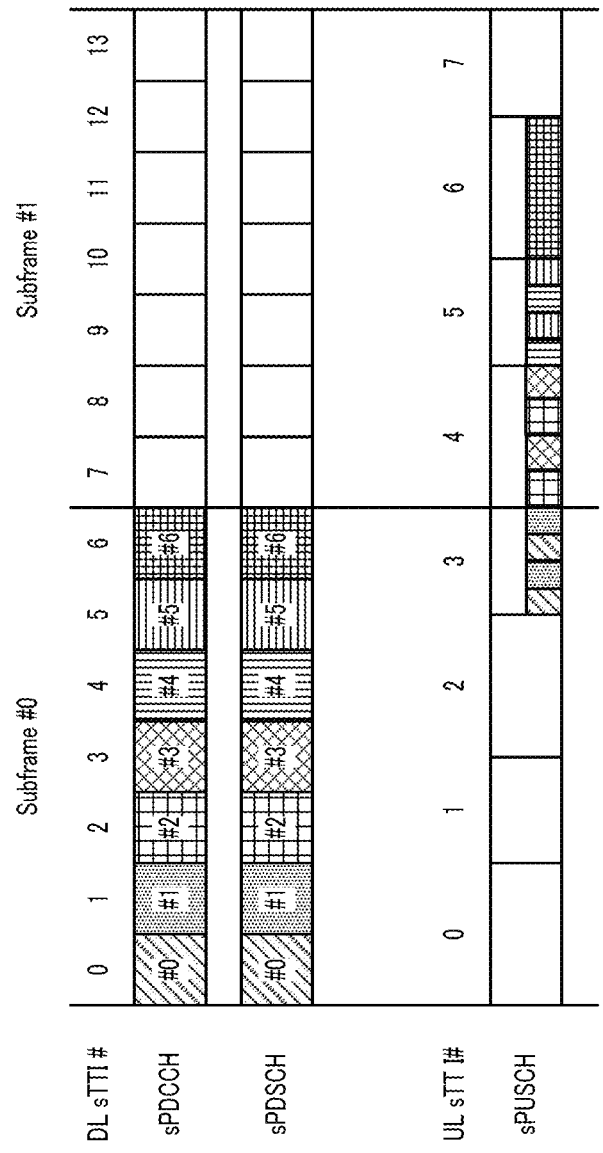
FIG. 12 is a diagram illustrating exemplary transmission and reception timings in DL data assignment according to Embodiment 1 (Operation Example 2-2)

FIG. 12 illustrates exemplary transmission and reception timings of an sPDCCH to which DL assignment indicating transmission of a DL data signal (sPDSCH) is mapped, and an sPDSCH, and transmission and reception timings of an sPDSCH and an ACK/NACK signal for this sPDSCH in Operation Example 2-2.

In Operation Example 2-2, as illustrated in FIG. 12, the UL sTTI length is set to three/four symbols, and the DL TTI length is set to two symbols, while X is set equal to 4. More specifically, in FIG. 12, every subframe has seven DL sTTIs, and DL sTTIs #0 to #13 are assigned in subframes #0 and #1. Moreover, in FIG. 12, every subframe has four UL sTTIs, and UL sTTIs #0 to #7 are assigned in subframes #0 and #1.

In other words, in Operation Example 2-2, as in Operation Example 2-1, the number of DL sTTIs (seven DL sTTIs per subframe) is seven over four (7/4) times of the number of UL sTTIs (four UL sTTIs per subframe).

Regarding DL assignment and sPDSCH, base station 100 transmits an sPDSCH indicated by DL assignment in the same DL sTTI as the DL sTTI in which the DL assignment is transmitted and received. For example, when transmitting the DL assignment of HARQ process ID #0 in DL sTTI #0, base station 100 transmits the sPDSCH in the same DL sTTI #0.

Regarding an sPDSCH and ACK/NACK signal, when X=4, base station 100 and terminal 200 start transmission and reception of an ACK/NACK signal for the sPDSCH after at least four DL sTTIs from transmission and reception of the sPDSCH based on the DL sTTI length. More specifically, at least the interval of three (=X−1) DL sTTIs is present from completion of the transmission and reception of the sPDSCH until start of transmission and reception of the ACK/NACK signal. In other words, base station 100 and terminal 200 transmit and receives the ACK/NACK signal in the very first UL sTTI positioned after the interval of three DL sTTIs from the transmission and reception timing of the sPDSCH.

For example, when base station 100 transmits the sPDSCH of HARQ process ID #0 in DL sTTI #0, the timing after the interval of three DL sTTIs from the timing of completion of transmission and reception of the sPDSCH (DL sTTI #0) is DL sTTI #4. Since the timing of DL sTTI #4 does not match the boundary between UL sTTIs, terminal 200 delays the transmission of the ACK/NACK signal until UL sTTI #3, which is the very first UL sTTI positioned rearward the timing of DL sTTI #4, and transmits the ACK/NACK signal for the sPDSCH of HARQ process ID #0 in UL sTTI #3.

Moreover, in FIG. 12, since the number of DL sTTIs is seven over four (7/4) times of the number of UL sTTIs, terminal 200 transmits ACK/NACK signals for two DL sTTIs per UL sTTI or transmits an ACK/NACK signal for one DL sTTI per UL sTTI. In FIG. 12, ACK/NACK signals for two DL sTTIs are transmitted in each of UL sTTIs #3, #4, and #5, while an ACK/NACK signal for one DL sTTI is transmitted in UL sTTI #6. As has been described, the maximum value for the number of ACK/NACK signals to be transmitted varies for each UL sTTI, so that terminal 200 can change the format to be used in transmission of an ACK/NACK signal for each UL sTTI.

In addition, in FIG. 12, some of the ACK/NACK signals for DL data signals (sPDSCHs) assigned in the same subframe #0 are transmitted in the same subframe #0, while the rest of the ACK/NACK signals are transmitted in subframe #1. In other words, the ACK/NACK signals for the DL data signals (sPDSCHs) assigned to the same subframe #0 are transmitted in different subframes #0 and #1. Thus, the feedback delay for DL data signals can be shortened, and latency reduction becomes more efficient.

Figures 13A, 13B:
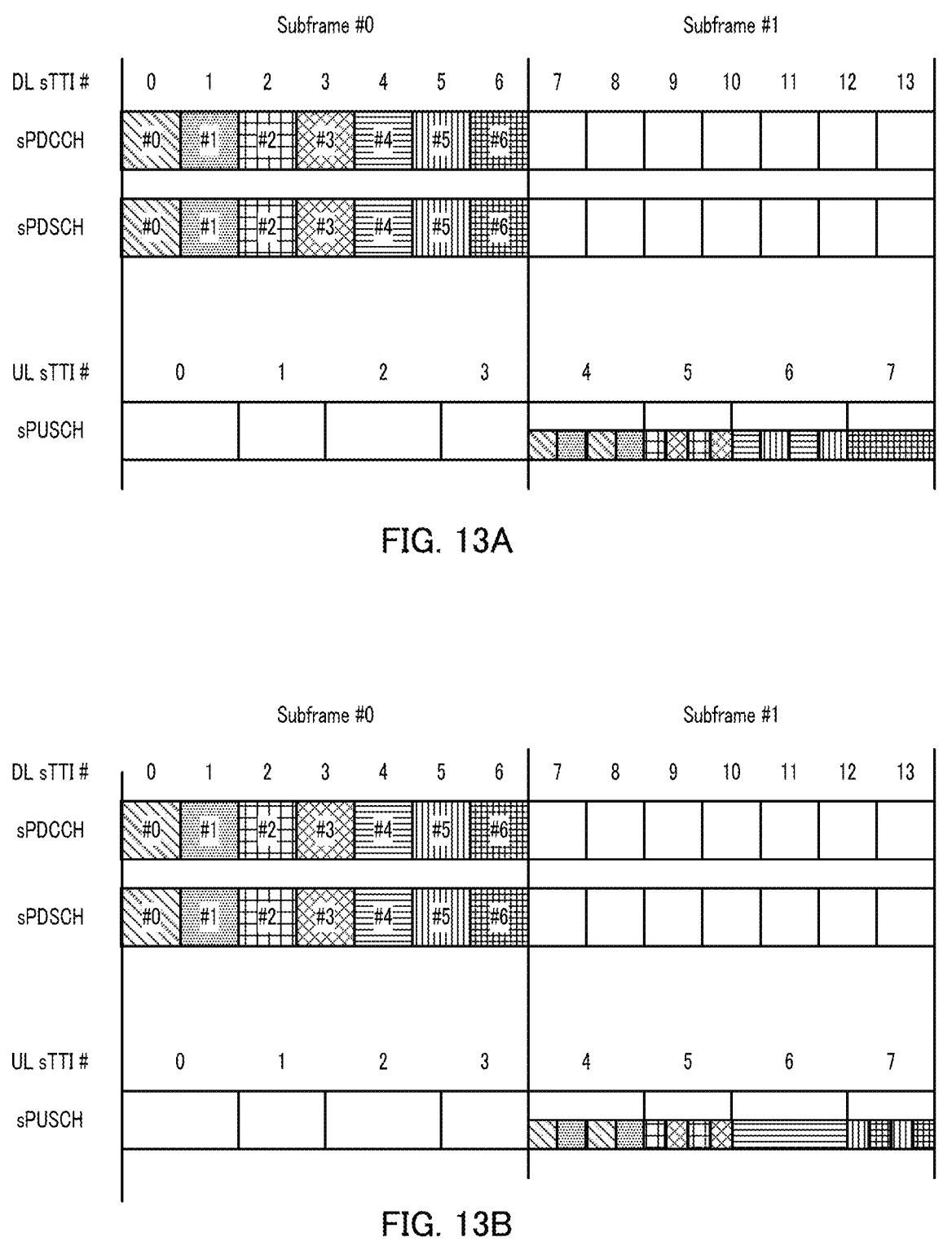

Note that, for example, when application such as interference control, CoMP, D2D and/or the like is determined in units of subframes and used, it is favorable that the use method be determined in units of subframes. In this respect, as illustrated in FIG. 13A or 13B, all ACK/NACK signals for the DL data signals (sPDSCHs) assigned to the same subframe may be transmitted in the same subframe. In other words, base station 100 and terminal 200 transmit and receive ACK/NACK signals respectively for a plurality of sPDSCHs transmitted and received in the same subframe in a plurality of UL sTTIs within a single subframe.

In FIG. 13A or 13B, the subframe in which the ACK/NACK signal for the sPDSCH transmitted in the last DL sTTI #6 of DL subframe #0 is subframe #1, so that all ACK/NACK signals including the ACK/NACK signals for the sPDSCHs transmitted in the other DL sTTIs in DL subframe #0 are transmitted in subframe #1.

As a first implementation method, the timing of ACK/NACK signals illustrated in FIG. 12 is shifted rearward by one UL sTTI. As a second implementation method, X=4 is changed to X=6. The value for X is configured so as to allow the ACK/NACK signals for the DL data signals (sPDSCHs) assigned in the same subframe to be transmitted in the same subframe. Accordingly, it is advantageous that interference control, CoMP, D2D, and/or the like of UL subframes be easily assigned in units of subframes.

Note that, the number of ACK/NACK signals transmitted in a UL sTTI differs between the first and the second implementation methods, but the maximum value as well as the minimum value for the number of ACK/NACK signals are the same between the first and the second implementation methods.

Operation Example 2-3: DL Data Assignment (UL Seven-Symbol sTTIs and DL Two-Symbol sTTIs)

Figure 14:
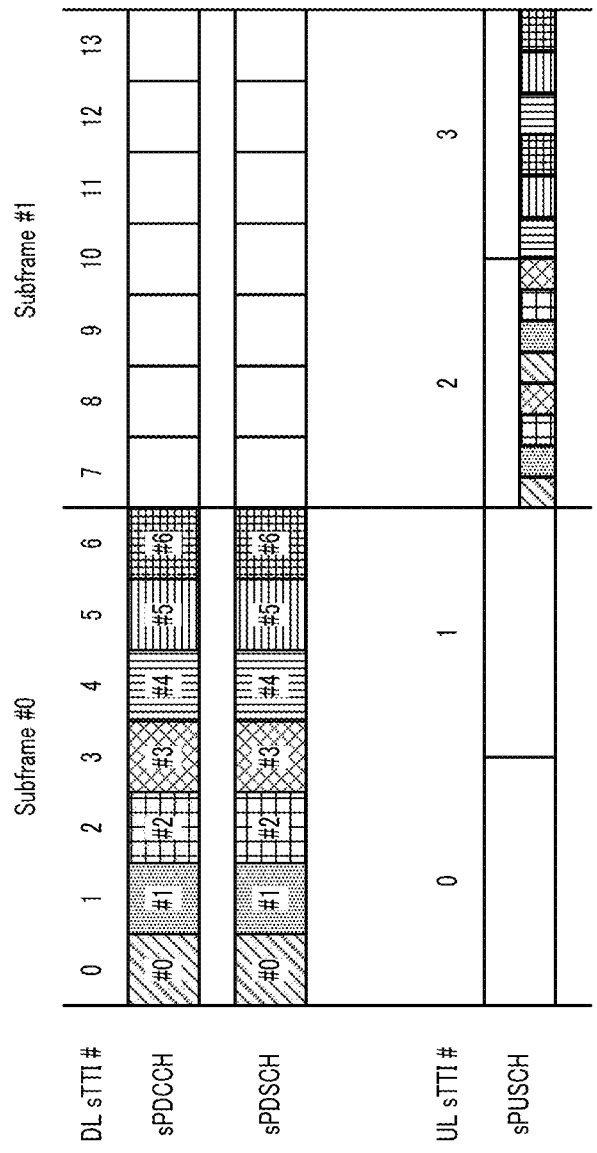
FIG. 14 is a diagram illustrating other exemplary transmission and reception timings in DL data assignment according to Embodiment 1 (Operation Example 2-3)

FIG. 14 illustrates exemplary transmission and reception timings of an sPDCCH to which DL assignment indicating transmission of a DL data signal (sPDSCH) is mapped, and an sPDSCH, and transmission and reception timings of an sPDSCH and an ACK/NACK signal for this sPDSCH in Operation Example 2-3.

In Operation Example 2-3, as illustrated in FIG. 14, the UL sTTI length is set to seven symbols, and the DL sTTI length is set to two symbols, while X is set equal to 4. More specifically, in FIG. 14, every subframe has seven DL sTTIs, and DL sTTIs #0 to #13 are assigned in subframes #0 and #1. Moreover, in FIG. 14, every subframe has two UL sTTIs, and UL sTTIs #0 to #3 are assigned in subframes #0 and #1.

In other words, in Operation Example 2-3, as in Operation Example 1-3, the number of DL sTTIs (seven DL sTTIs per subframe) is seven over two (7/2) times of the number of UL sTTIs (two UL sTTIs per subframe).

Regarding DL assignment and sPDSCH, base station 100 assigns an sPDSCH indicated by DL assignment in the same DL sTTI as the DL sTTI in which the DL assignment is transmitted and received. For example, when transmitting the DL assignment of HARQ process ID #0 in DL sTTI #0, base station 100 transmits the sPDSCH in the same DL sTTI #0.

Regarding an sPDSCH and ACK/NACK signal, when X=4, base station 100 and terminal 200 start transmission and reception of an ACK/NACK signal for the sPDSCH after at least four DL sTTIs from transmission and reception of the sPDSCH based on the DL sTTI length. More specifically, at least the interval of three (=X−1) DL sTTIs is present from completion of the transmission and reception of the sPDSCH until start of transmission and reception of the ACK/NACK signal. In other words, base station 100 and terminal 200 transmit and receive the ACK/NACK signal in the very first UL sTTI positioned after the interval of three DL sTTIs from the transmission and reception timing of the sPDSCH.

For example, when base station 100 transmits the sPDSCH of HARQ process ID #0 in DL sTTI #0, the timing after the interval of three DL sTTIs from the timing of completion of the transmission and reception of the sPDSCH (DL sTTI #0) is DL sTTI #4. Since the timing of DL sTTI #4 does not match the boundary between UL sTTIs, terminal 200 delays the transmission of the ACK/NACK signal until UL sTTI #2, which is the very first UL sTTI positioned rearward the timing of DL sTTI #4, and transmits the ACK/NACK signal for the sPDSCH of HARQ process ID #0 in UL sTTI #2.

Moreover, in FIG. 14, since the number of DL sTTIs is seven over two (7/2) times of the number of UL sTTIs, terminal 200 transmits ACK/NACK signals for four DL sTTIs per UL sTTI or transmits ACK/NACK signals for three DL sTTIs per UL sTTI. In FIG. 14, ACK/NACK signals for four DL sTTIs are transmitted in UL sTTI #2, and ACK/NACK signals for three DL sTTIs are transmitted in UL sTTI #3. As has been described, the maximum value for the number of ACK/NACK signals to be transmitted varies for each UL sTTI, so that terminal 200 can change the format to be used for transmission of ACK/NACK signals for each UL sTTI.

Operation Examples 2-1, 2-2, and 2-3 in DL data assignment have been described thus far.

As described above, in Embodiment 1, base station 100 and terminal 200 transmit and receive downlink signals (sPDCCH, sPDSCH, and ACK/NACK signal) using DL sTTIs shortened in length than a TTI and transmit and receive uplink signals (sPUSCH and ACK/NACK signal) using UL sTTIs shortened in length than the TTI. In this case, when the DL sTTI length is shorter than the UL sTTI length, base station 100 and terminal 200 transmit and receive an uplink signal in a UL sTTI positioned after a predetermined interval from the transmission timing of a downlink signal, while the predetermined interval is configured based on the DL sTTI length. Moreover, when the determined transmission and reception timing does not match the boundary between UL sTTIs, base station 100 and terminal 200 delay the transmission and reception timing until the timing that matches the boundary between UL sTTIs.

Accordingly, even when the DL and UL sTTI lengths are different from each other, base station 100 and terminal 200 can start transmission and reception of a signal from the boundary between DL sTTIs and the boundary between UL sTTIs. Thus, according to Embodiment 1, the timings of data assignment, data transmission and reception, and feedback for a case where the DL and UL sTTI lengths are different from each other can be appropriately configured.

Note that, in Embodiment 1, an example in which ACK/NACK signals are assigned to ACK/NACK resources is illustrated, but the ACK/NACK resources may be physical uplink control channel (PUCCH) resources. In addition, when a UL data signal is assigned, a method may be used in an ACK/NACK signal is multiplexed to the UL data signal and transmitted. In this case, when there is even one UL sTTI in which a UL data signal is assigned among a plurality of UL sTTIs, terminal 200 may transmit, in the UL sTTI, an ACK/NACK signal for sPDSCHs transmitted in a plurality of DL sTTIs. With this configuration, the situation where the PUCCH format and PUSCH format coexist in a subframe no longer occurs, and terminal 200 can advantageously transmit signals in a subframe, using a single format.

Moreover, as to the combination of DL and UL sTTI lengths, the operation of this disclosure can be applied to a combination other than the combinations illustrated in the operation examples of Embodiment 1.

Embodiment 2

The basic configurations of a base station and a terminal according to Embodiment 2 are common to those of base station 100 and terminal 200 according to Embodiment 1, so that the base station and terminal according to Embodiment 2 will be described with reference to FIGS. 4 and 5.

In Embodiment 2, when the DL and UL sTTI lengths are different from each other and the DL sTTI length is shorter than the UL sTTI length, base station 100 and terminal 200 determine the transmission and reception timings of data assignment (UL grant and DL assignment in sPDCCH), data transmission and reception (sPUSCH and sPDSCH), and feedback (ACK/NACK signal) based on the DL sTTI length and an absolute time.

The term "absolute time" refers to a fixed length of time taking into account the time required for delay in processing or for communication with an upper layer.

Moreover, when the UL timing determined based on the DL sTTI length does not match the boundary between UL sTTIs, base station 100 and terminal 200 delay the UL timing until the timing that matches the boundary between UL sTTIs as in Embodiment 1.

More specifically, regarding DL data, base station 100 and terminal 200 transmit and receive an ACK/NACK signal for an sPDSCH in a UL sTTI after a predetermined interval from the transmission and reception timing of the sPDSCH, while the predetermined interval is configured based on the DL sTTI length and absolute time.

Moreover, regarding UL data, base station 100 and terminal 200 transmit and receive an sPUSCH assigned by a UL grant in a UL sTTI positioned after a predetermined interval from the transmission and reception timing of the sPDCCH containing the UL grant, while the predetermined interval is configured based on the DL sTTI length and absolute time. Moreover, base station 100 and terminal 200 transmit and receive an ACK/NACK signal for an sPUSCH in a DL sTTI positioned after a predetermined interval from the transmission and reception timing of the sPUSCH, while the predetermined interval is configured based on the DL sTTI length and absolute time.

For example, base station 100 and terminal 200 may transmit and receive the second signal at the timing after elapse of the time obtained by adding an absolute time (Y) to the interval of a predetermined number (X) of DL sTTIs from the transmission and reception timing of the first signal. More specifically, base station 100 and terminal 200 define the timings of data assignment, data transmission and reception, and feedback (transmission timing of the second signal for the first signal) in the following manner. The absolute time herein is represented by "Y msec."

Timings for DL Data
  DL assignment in sPDCCH-sPDSCH: same sTTI
    sPDSCH-ACK/NACK feedback: at least after X DL
    sTTIs+Y msec
Timings for UL Data
  UL grant in sPDCCH-sPUSCH: at least after X DL
    sTTIs+Y msec sPUSCH-ACK/NACK feedback: at
    least after X DL sTTIs+Y msec Note that, the expression "at least after X DL sTTIs+Y msec" means that at least the interval of (X−1) sTTI(s)+Y msec is present from completion of transmission and reception of the first signal (the DL assignment, sPDSCH, UL grant, or sPUSCH) until start of transmission and reception of the second signal (the sPDSCH, ACK/NACK feedback, sPUSCH or ACK/NACK feedback), and the second signal is assigned to the very first sTTI positioned after the interval.

Hereinafter, the operations of data assignment, data transmission and reception, and feedback in base station 100 and terminal 200 will be described in detail.

Hereinafter, as in Operation Examples 1-1 and 2-1 of Embodiment 1, the UL sTTI length is set to seven symbols and the DL sTTI length is set to three/four symbols, while X is set equal to 4. In addition, the absolute time Y=0.5 msec.

Figure 15:
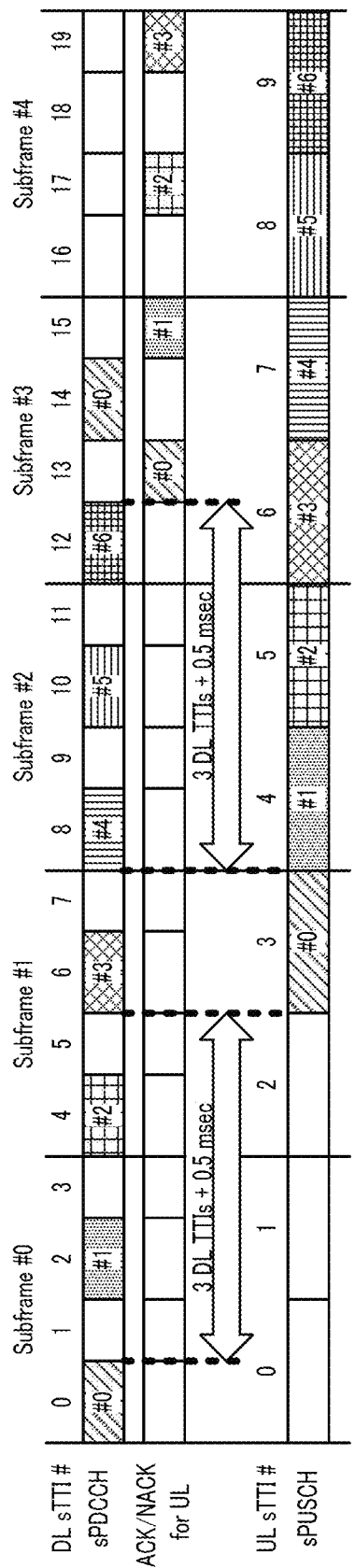
FIG. 15 is a diagram illustrating exemplary transmission and reception timings in UL data assignment according to Embodiment 2.

FIG. 15 illustrates exemplary transmission and reception timings of an sPDCCH to which a UL grant indicating transmission of a UL data signal (sPUSCH) is mapped, and an sPUSCH, and transmission and reception timings of an sPUSCH and an ACK/NACK signal for the sPUSCH.

Regarding a UL grant and sPUSCH, when X=4, base station 100 and terminal 200 start transmission and reception of an sPUSCH after at least four DL sTTIs+0.5 msec from transmission and reception of a UL grant (sPDCCH) based on the DL sTTI length and absolute time Y. More specifically, at least the interval of three (=X−1) DL sTTIs+0.5 msec is present from completion of transmission and reception of the UL grant until start of transmission and reception of the sPUSCH. In other words, base station 100 and terminal 200 transmit the sPUSCH in the very first UL sTTI positioned after the interval of three DL sTTIs+0.5 msec.

Likewise, regarding an sPUSCH and ACK/NACK signal, when X=4, base station 100 and terminal 200 start transmission and reception of an ACK/NACK signal for an sPUSCH after at least four DL sTTIs+0.5 msec from transmission and reception of the sPUSCH based on the DL sTTI length and absolute time Y. More specifically, at least the interval of three (=X−1) DL sTTIs+0.5 msec is present from completion of transmission and reception of the sPUSCH until start of transmission and reception of the ACK/NACK signal. In other words, base station 100 and terminal 200 transmit and receive the ACK/NACK signal in the very first DL sTTI positioned after the interval of three DL sTTIs+0.5 msec from the transmission and reception timing of the sPUSCH.

Figure 16:
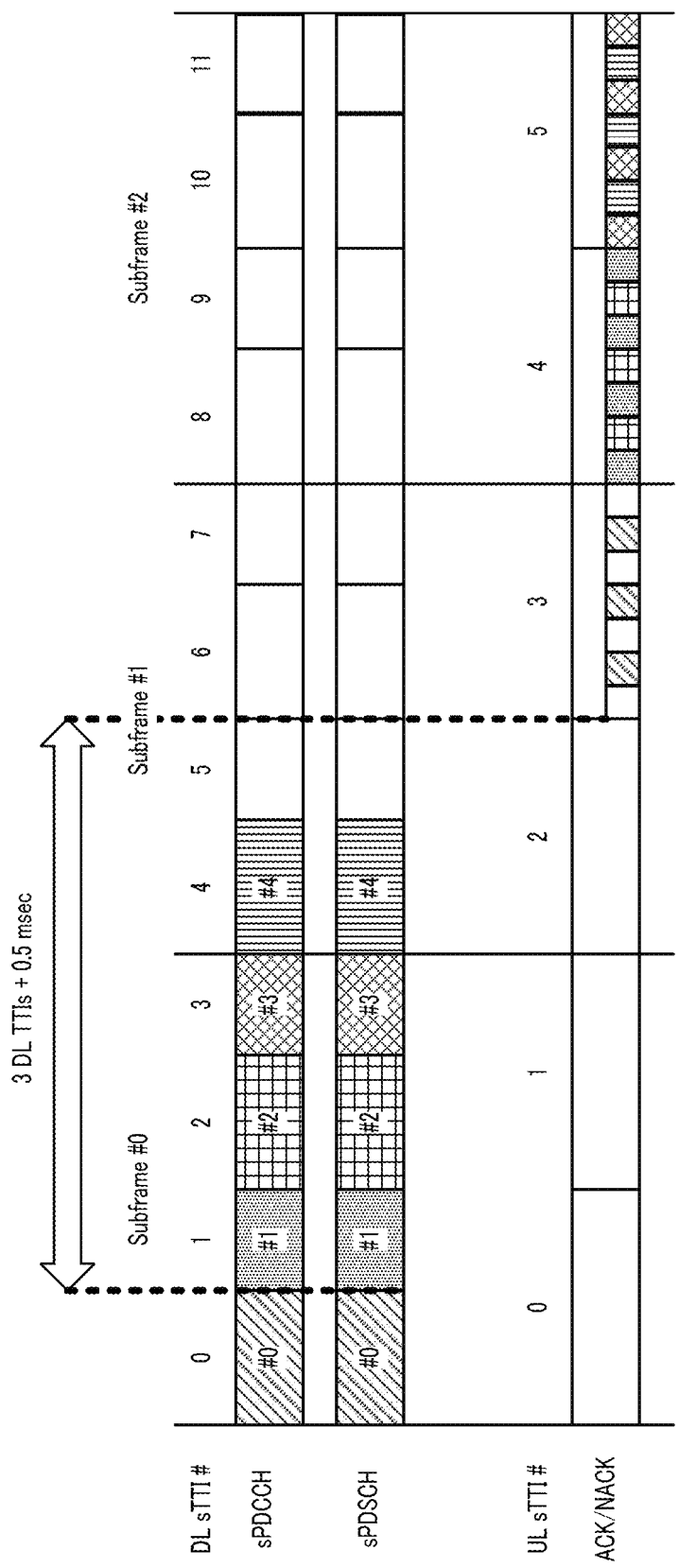
FIG. 16 is a diagram illustrating other exemplary transmission and reception timings in DL data assignment according to Embodiment 2.

FIG. 16 illustrates exemplary transmission and reception timings of an sPDCCH to which DL assignment indicating transmission of a DL data signal (sPDSCH) is mapped, and an sPDSCH, and transmission and reception timings of an sPDSCH and the ACK/NACK signal for the sPDSCH.

Regarding DL assignment and sPDSCH, base station 100 transmits an sPDSCH indicated by DL assignment in the same DL sTTI as the DL sTTI in which the DL assignment is transmitted and received.

Regarding an sPDSCH and ACK/NACK signal, when X=4, base station 100 and terminal 200 start transmission and reception of an ACK/NACK signal for an sPDSCH after at least four DL sTTIs+0.5 msec from transmission and reception of the sPDSCH based on the DL sTTI length and absolute time Y. More specifically, at least the interval of three (=X−1) DL sTTIs+0.5 msec is present from completion of transmission and reception of the sPDSCH until start of transmission and reception of the ACK/NACK signal. In other words, base station 100 and terminal 200 transmit the ACK/NACK signal in the very first UL sTTI positioned after the interval of three DL sTTIs+0.5 msec from the transmission and reception timing of the sPDSCH.

Thus, base station 100 and terminal 200 can secure the time required for delay in processing or for communication with an upper layer in each apparatus.

(Variation)

Base station 100 and terminal 200 may define the timings of data assignment, data transmission and reception, and feedback (transmission timing of the second signal for the first signal) in the following manner.

Timings for DL Data
  DL assignment in sPDCCH-sPDSCH: same sTTI
    sPDSCH-ACK/NACK feedback: at least Max (X−1 DL
    sTTIs, Y msec) interval
Timings for UL Data
  UL grant in sPDCCH-sPUSCH: at least Max (X−1 DL
    sTTIs, Y msec) interval
  sPUSCH-ACK/NACK feedback: at least Max (X−1 DL
    sTTIs, Y msec) interval Note that, the expression "Max (X−1 DL sTTIs, Y msec)" means selecting a larger one of X−1 DL sTTIs and Y msec.

In other words, base station 100 and terminal 200 transmit the second signal in the very first UL sTTI positioned after the elapse of a larger one of the interval of a predetermined number (X−1) of DL sTTIs and absolute time Y from the transmission and reception timing of the first signal.

With this configuration, when the sTTI length is longer than absolute time Y, the time required for delay in processing or for communication with an upper layer in each apparatus can be secured by the sTTI length alone, and the interval can be configured using the sTTI length alone without configuring absolute time Y, so that the configuration with extra delay can be avoided. Meanwhile, when the sTTI length is shorter than absolute time Y, the time required for delay in processing or for communication with an upper layer in each apparatus can be sufficiently secured.

Embodiment 3

The basic configurations of a base station and a terminal according to Embodiment 3 are common to base station 100 and terminal 200 according to Embodiment 1, so that the base station and terminal according to Embodiment 3 will be described with reference to FIGS. 4 and 5.

In Embodiments 1 and 2, an assumption is made that base station 100 and terminal 200 can use all sTTIs. However, because of the presence of the region used by a legacy terminal (terminal that does not support sTTIs), the PDCCH region used for a common search space, or mapping of a reference signal such as a cell-specific reference signal (CRS), a demodulation reference signal (DMRS), a channel state information reference signal (CSI-RS), or a sounding reference signal (SRS), the resources available for transmission and reception of data and a control signal in the sTTI region are reduced. For this reason, not using the sTTIs for transmission and reception of data and a control signal, or combining adjacent sTTIs to use the sTTIs as a single sTTI may be considered. In addition, the number of sTTIs may be different between DL and UL because the amount of control signals and reference signals differs between DL and UL.

In this respect, in this embodiment, a description will be given of a method of configuring the timings of data assignment, data transmission and reception, and feedback for a case where the available sTTIs vary for each subframe.

Base station 100 and terminal 200 use, as a DL reference subframe, the subframe in which all the sTTIs within the subframe are available, which includes no adjacent subframes to be combined for use as a single sTTI, and which thus has the largest number of sTTIs. Base station 100 and terminal 200 determine the transmission and reception timings of data assignment (UL grant and DL assignment in sPDCCH), data (sPUSCH and sPDSCH), and feedback (ACK/NACK signal) based on the DL sTTI length in the DL reference subframe.

In addition, as in Embodiment 1, when the UL timing determined based on the DL sTTI length does not match the boundary between UL sTTIs, base station 100 and terminal 200 delay the UL timing to the timing that matches the boundary between UL sTTIs.

More specifically, as in Embodiment 1, base station 100 and terminal 200 may define the timings of data assignment, data transmission and reception, and feedback (transmission timing of the second signal for the first signal) in the following manner.

Timings for DL Data
DL assignment in sPDCCH-sPDSCH: same sTTI
sPDSCH-ACK/NACK feedback: after at least X DL sTTIs
Timings for UL Data
UL grant in sPDCCH-sPUSCH: after at least X DL sTTIs
sPUSCH-ACK/NACK feedback: after at least X DL sTTIs Note that, the expression "at least X DL sTTIs" means that at least the interval of (X−1) sTTI(s) is present from completion of transmission and reception of the first signal (the DL assignment, sPDSCH, UL grant, or sPUSCH) until start of transmission and reception of the second signal (the sPDSCH, ACK/NACK feedback, sPUSCH or ACK/NACK feedback), and the second signal is assigned in the very first sTTI positioned after the interval.

In this embodiment, when the DL sTTI positioned before the predetermined interval from the timing at which the uplink signal (sPUSCH) is received (the above defined timing) is unavailable for signal assignment in a subframe having a smaller number of the DL sTTIs available for signal assignment than the DL reference subframe, base station 100 transmits the downlink signal (sPDCCH) in the DL sTTI positioned most rearward before the DL sTTI which is unavailable for the signal assignment. Likewise, when the DL sTTI positioned after the predetermined interval from the timing of the UL sTTI in which the uplink signal (sPUSCH) is received (the above defined timing) is unavailable for signal assignment in a subframe having a smaller number of the DL sTTIs available for signal assignment than the reference subframe, base station 100 transmits the ACK/NACK signal for the uplink signal in the very first DL sTTI positioned after the DL sTTI which is unavailable for signal assignment.

Hereinafter, the operations of data assignment, data transmission and reception, and feedback in base station 100 and terminal 200 will be described in detail.

Operation Example 3-1

Figure 17:
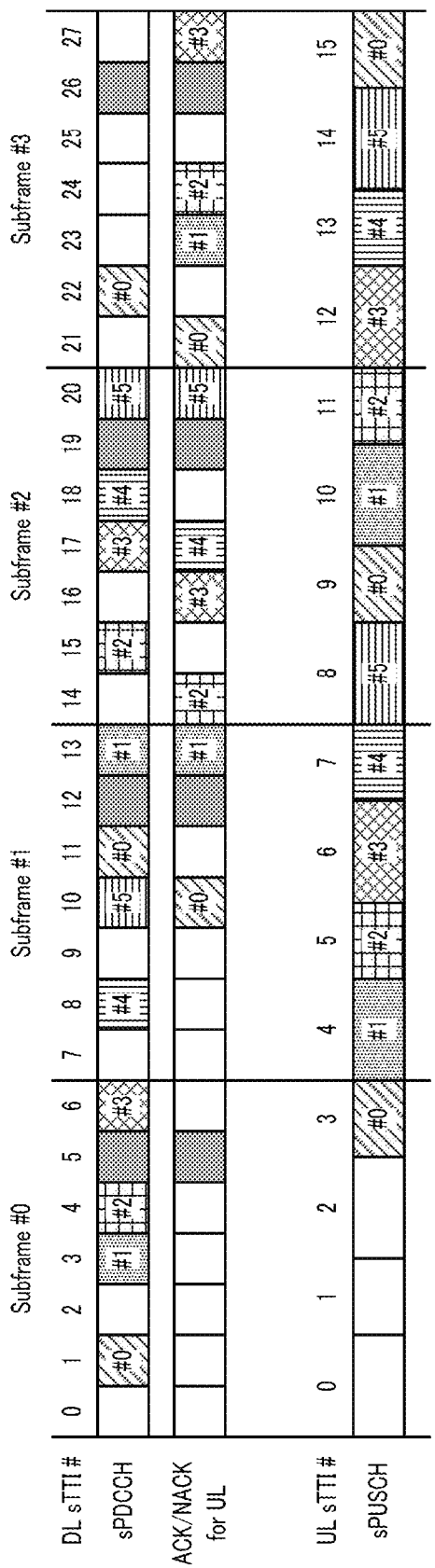
FIG. 17 is a diagram illustrating exemplary transmission and reception timings in UL data assignment according to Embodiment 3.

FIG. 17 illustrates exemplary transmission and reception timings of an sPDCCH to which a UL grant indicating transmission of a UL data signal (sPUSCH) is mapped, and an sPUSCH, and transmission and reception timings of an sPUSCH and the ACK/NACK signal for this sPUSCH.

As illustrated in FIG. 17, as in Operation Example 1-2 (see FIG. 7) of Embodiment 1, the UL sTTI length is set to three/four symbols, and the DL TTI length is set to two symbols, while X is set equal to 4. Meanwhile, base station 100 and terminal 200 cannot use the sixth DL sTTI in all subframes (DL sTTIs #5, #12, #19, and #26).

Regarding a UL grant and sPUSCH, when X=4, in the subframe in Operation Example 1-2 (DL reference subframe), the sPUSCH transmitted in UL sTTI #5 is assigned by the UL grant transmitted in DL sTTI #5 positioned before the interval of three DL sTTIs from DL sTTI #9 which is the same timing as UL sTTI #5. In FIG. 17, DL sTTI #5 is unavailable, however. Thus, base station 100 transmits the UL grant in DL sTTI #4 right before DL sTTI #5. Likewise, base station 100 transmits, in DL sTTIs #11 and #18, the UL grants which indicate assignment for the sPUSCHs in UL sTTI #9 and UL sTTI #13 and which are planned to be transmitted in DL sTTIs #12 and #19.

Regarding an sPUSCH and ACK/NACK signal, when X=4, in the subframe illustrated in Operation Example 1-2 (DL reference subframe), the ACK/NACK signal for the sPUSCH in UL sTTI #4 is transmitted in DL sTTI #12 positioned after the interval of three DL sTTIs from DL sTTI #8 which is the same timing as UL sTTI #4. In FIG. 17, DL sTTI #12 is unavailable, however. Thus, base station 100 delays the transmission timing of the ACK/NACK signal and transmits the signal in DL sTTI #13. Likewise, when X=4, in Operation Example 1-2, the ACK/NACK signals for the sPUSCHs in UL sTTI #8 and #12 are transmitted in DL sTTIs #19 and #26 positioned after the interval of three DL sTTIs from DL sTTIs #15 and #22 which are the same timings as UL sTTIs #8 and #12, respectively. However, DL sTTIs #19 and 26 are unavailable in FIG. 17. Thus, base station 100 delays the transmission timing of the ACK/NACK signals and transmits the signals in DL sTTIs #20 and #27.

Meanwhile, in FIG. 17, the number of DL sTTIs is greater than the number of UL sTTIs, so that there is no impact on the number of UL HARQ processes even when some DL sTTIs are unavailable. However, when there are many unavailable DL sTTIs or serial DL sTTIs are unavailable, the delay amount increases, so that the number of UL HARQ processes needs to be increased.

Operation Example 3-2

In Operation Example 3-2, a description will be given of an operation for a case where the UL and DL sTTI lengths are the same.

Figure 18:
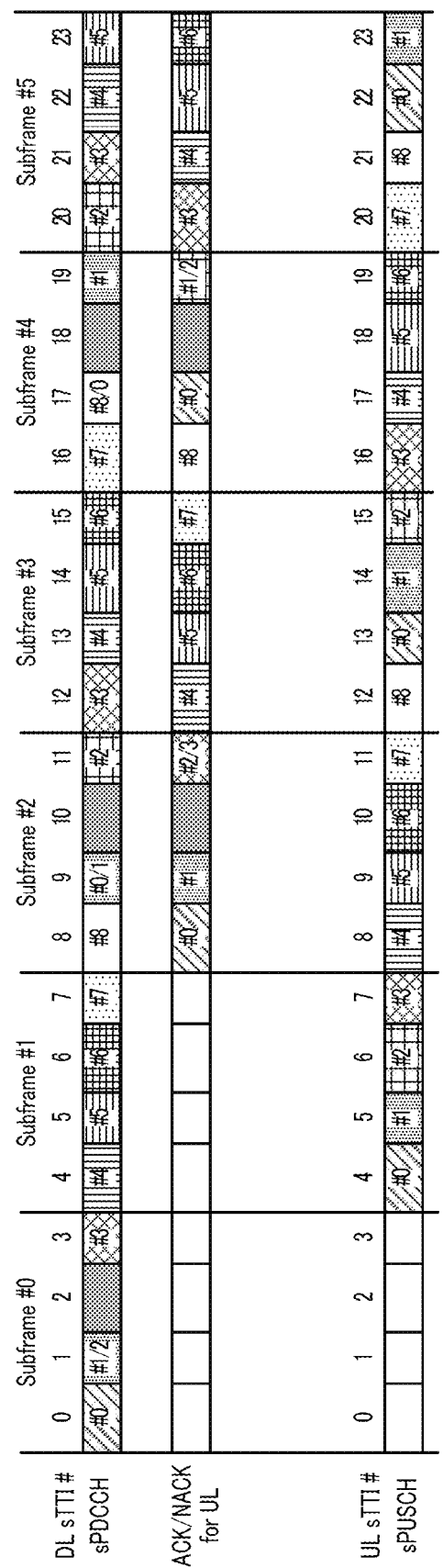
FIG. 18 is a diagram illustrating other exemplary transmission and reception timings in UL data assignment according to Embodiment 3.

FIG. 18 illustrates exemplary transmission and reception timings of an sPDCCH to which a UL grant indicating transmission of a UL data signal (sPUSCH) is mapped, and an sPUSCH, and transmission and reception timings of an sPUSCH and the ACK/NACK signal for this sPUSCH.

As illustrated in FIG. 18, the UL and DL sTTI lengths are both set to three/four symbols, while X is set equal to 4. In other words, one subframe is divided into four sTTIs. Meanwhile, base station 100 and terminal 200 cannot use the third DL sTTI in even number subframes (DL sTTI #2, #10, and #18). In other words, the number of DL sTTIs available for signal assignment using sTTIs in the even number subframes is small as compared with odd number subframes (DL reference subframes).

In a case where all DL sTTIs are available, the minimum number of UL HARQ process IDs is eight when X is equal to 4. However, since some DL sTTIs are unavailable in Operation Example 3-2, the delay in UL assignment and ACK/NACK feedback increases, so that the minimum number of UL HARQ process IDs is nine.

Regarding a UL grant and sPUSCH, when X=4 and all DL sTTIs are available, the sPUSCH transmitted in UL sTTI #6 is assigned by the UL grant transmitted in DL sTTI #2 positioned before the interval of three DL sTTIs from DL sTTI #6 which is the same timing as UL sTTI #6. In FIG. 18, DL sTTI #2 is unavailable, however. Thus, base station 100 transmits the UL grant in DL sTTI #1 positioned right before DL sTTI #2. Likewise, base station 100 transmits, in DL sTTIs #9 and #17, the UL grants which indicate assignment for the sPUSCHs in UL sTTIs #14 and #22 and which are planned to be transmitted in DL sTTIs #10 and #18.

Regarding an sPUSCH and ACK/NACK signal, when X=4 and all DL sTTIs are available, the ACK/NACK signal for the sPUSCH in UL sTTI #6 is transmitted in DL sTTI #10 positioned after the interval of three DL sTTIs from DL sTTI #6 which is the same timing as UL sTTI #6. In FIG. 18, DL sTTI #10 is unavailable, however. Thus, base station 100 delays the transmission timing of the ACK/NACK signal and transmits the signal in DL sTTI #11. Likewise, when X=4 and all DL sTTIs are available, the ACK/NACK signal for the sPUSCH in UL sTTI #14 is transmitted in DL sTTI #18 positioned after the interval of three DL sTTIs from DL sTTI #14 which is the same timing as UL sTTI #14. However, DL sTTI #18 is unavailable in FIG. 18. Thus, base station 100 delays the transmission timing of the ACK/NACK signal and transmits the signal in DL sTTI #19.

Operation Examples 3-1 and 3-2 have been described thus far.

As described above, in Embodiment 3, base station 100 and terminal 200 determine the timings of data assignment, data transmission and reception, and feedback based on the DL sTTI length as in Embodiment 1 even when a DL subframe has a DL sTTI to which no signal can be assigned. In addition, when the determined DL timing is the DL sTTI to which no signal can be assigned, base station 100 and terminal 200 transmit a DL signal (data signal or ACK/NACK signal) at a timing before or after the determined DL timing.

Accordingly, base station 100 and terminal 200 can start transmission and reception of a signal from the boundary between DL sTTIs and the boundary between UL sTTIs as in Embodiment 1, even when the number of DL sTTIs differs among subframes. Thus, according to Embodiment 3, the timings of data assignment, data transmission and reception and feedback for a case where the TTI length is shortened can be appropriately configured.

Note that, when the top DL sTTI in a DL subframe is unavailable, a PDCCH can be used as a substitute. Base station 100 transmits a control signal and an ACK/NACK signal to be assigned in the sTTI, using a PDCCH, thus causing no delay and resulting in an advantage of no impact on the number of HARQ process IDs.

Embodiment 4

The basic configurations of a base station and a terminal according to Embodiment 4 are common to base station 100 and terminal 200 according to Embodiment 1, so that the base station and terminal according to Embodiment 4 will be described with reference to FIGS. 4 and 5.

There may be a case where, during the operation using an sTTI length, the sTTI length is returned to the normal TTI length because the communication quality is poor or latency reduction is no longer required. In this respect, in Embodiment 4, a description will be given of the operation in switching from the sTTI length to the normal TTI length (one subframe).

As a method of returning to the normal TTI, a method in which assignment is made with the normal TTI length using a common search space (CSS), or a method in which change to the normal TTI length is indicated by the MAC layer may be considered. In these cases, there are a method which keeps the HARQ process ID used in the sTTI and a method which does not keep the HARQ process ID used in the sTTI.

When not keeping the HARQ process ID, base station 100 and terminal 200 delete the signals in the HARQ buffer and newly start communication as all new data.

Meanwhile, when keeping the HARQ process ID, base station 100 indicates the kept HARQ process ID to terminal 200, using DL assignment with the normal TTI length.

Moreover, in case of UL, no HARQ process ID is indicated to terminal 200, so that base station 100 and terminal 200 need a structure in which the UL HARQ process IDs are previously shared between the sTTIs and normal TTIs. As a structure to share the HARQ process IDs, terminal 200 associates the sTTIs with the TTIs based on a subframe in which switching of the TTI length is received.

Figure 19:
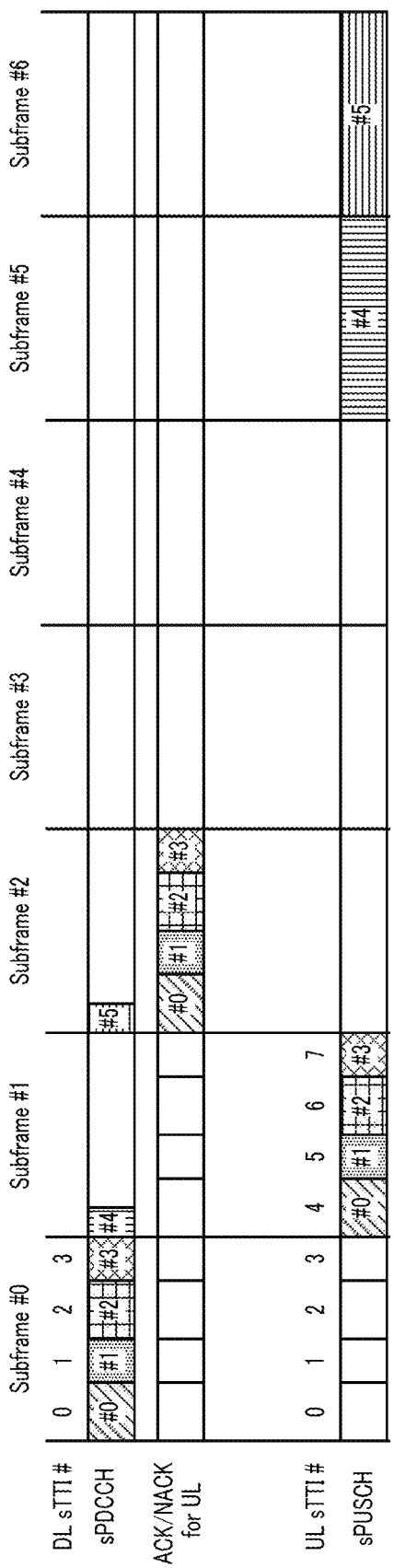
FIG. 19 is a diagram illustrating exemplary transmission and reception timings in UL data assignment according to Embodiment 4.

FIG. 19 illustrates an operation to switch between sTTIs and a TTI in subframe #1.

In FIG. 19, the sTTIs are applied in subframe #0 and terminal 200 detects the UL grants of HARQ process IDs #0, #1, #2, and #3. Moreover, an assumption is made that terminal 200 detects a UL grant in a normal TTI in the PDCCH of subframe #1.

In this case, for HARQ process IDs #0, #1, #2, and #3 which are the sTTI operation, terminal 200 performs transmission processing of the sPUSCHs with the sTTI operation in UL of subframe #1. In this case, base station 100 may transmit, in subframe #2, the ACK/NACK signals for the sPUSCHs transmitted in the sTTIs. Moreover, when NACK is transmitted in subframe #1, terminal 200 can retransmit the sPUSCH in subframe #3 (not illustrated). As a result, the resources used until the PUSCH transmission is switched to the normal TTI can be effectively utilized.

Note that, base station 100 may cancel the transmission of the ACK/NACK signals in subframe #2, and cause terminal 200 to recognize all ACKs and allow for only adaptive retransmission using the normal TTI.

In the top DL sTTI of subframe #1, UL HARQ process ID #4 is transmittable when the sTTI operation is kept. In this respect, terminal 200 recognizes that the UL grant of UL HARQ process ID #4 is transmitted in the PDCCH of subframe #1 and transmits the PUSCH of HARQ process ID #4 in subframe #5 positioned after four subframes (the interval of three DL subframes) in accordance with the rules of LTE/LTE-Advanced, based on subframe #1. In addition, terminal 200 recognizes that the UL grant of HARQ process ID #5 is transmitted in the PDCCH of the next subframe #2.

As described above, base station 100 and terminal 200 use the sTTIs for HARQ process IDs #0 to #3 and switch the sTTIs to the TTIs for UL HARQ process ID #4 and thereafter. More specifically, base station 100 and terminal 200 use common HARQ process IDs between the period when the sTTIs (DL sTTIs and UL sTTIs) are used and the period when the TTIs are used.

As a result, even when switching from sTTIs to normal TTIs is performed, base station 100 and terminal 200 can keep retransmission processing of a UL data signal. Moreover, base station 100 and terminal 200 can reduce the buffer amount because base station 100 and terminal 200 do not need to have a duplicate of HARQ buffer for sTTIs and TTIs.

Each embodiment of the present disclosure has been described thus far.

Note that, the HARQ timings based on FDD have been described in the above embodiments, but the present disclosure can be applied to the HARQ timings based on TDD. When the present disclosure is applied to the HARQ timings based on TDD, bundling between subframes may be further applied.

In addition, the case where the transmission and reception timings of signals are determined based on the DL sTTI length has been described in the above embodiments, but the transmission and reception timings of signals may be determined based on the UL sTTI length.

Moreover, the case where X is equal to 4 has been described in the above embodiment, but the value for X may be a value other than 4.

In addition, the UL transmission timings are also adjusted by Timing Advanced (TA) in the above embodiments. Accordingly, the actual UL transmission timings may be determined to start transmission earlier by a predetermined amount of TA, in addition to the timing defined in the above embodiments.

In Embodiment 1, the restriction is applied so that a UL grant is transmitted only in a particular DL sTTI, but the other embodiments are by no means limited to this restriction. Transmission of a UL grant may be performed in any DL sTTI as long as the DL sTTI is positioned at least before X DL sTTIs from the UL sTTI in which a PUSCH is transmittable, and a UL grant for a single UL sTTI may be transmitted from a plurality of DL sTTIs. In this case, the number of DL sTTIs to be monitored by terminal 200 for UL grants increases, but there is an advantage in that control signals can be easily dispersed.

In addition, the shortening of a TTI length is applicable not only to a system extending LTE, but also to a system implemented with a new frame format called "New radio access technology (RAT)."

The above embodiments have been described with an example in which an aspect of the present disclosure is implemented using a hardware configuration by way of example, but the present disclosure may also be implemented by software in cooperation with hardware.

In addition, the functional blocks used in the descriptions of the embodiments are typically implemented as LSI devices, which are integrated circuits having an input and output. The integrated circuits may control the functional blocks used in the descriptions of the embodiments and may include an input and output. The functional blocks may be formed as individual chips, or a part or all of the functional blocks may be integrated into a single chip. The term "LSI" is used herein, but the terms "IC," "system LSI," "super LSI" or "ultra LSI" may be used as well depending on the level of integration.

In addition, the circuit integration is not limited to LSI and may be achieved by dedicated circuitry or a general-purpose processor. After fabrication of LSI, a field programmable gate array (FPGA), which is programmable, or a reconfigurable processor which allows reconfiguration of connections and settings of circuit cells in LSI may be used.

Should a circuit integration technology replacing LSI appear as a result of advancements in semiconductor technology or other technologies derived from the technology, the functional blocks could be integrated using such a technology. Another possibility is the application of biotechnology and/or the like.

A base station of this disclosure includes: a transmission section that transmits a downlink signal using a first short transmission time interval (sTTI) shortened in length than a TTI and used for downlink; and a reception section that receives an uplink signal using a second sTTI shortened in length than the TTI and used for uplink, in which, when the first sTTI is shorter in length than the second sTTI, the reception section receives the uplink signal in the second sTTI positioned after a predetermined interval from a transmission timing of the downlink signal, the predetermined interval being configured based on the length of the first sTTI.

In the base station of this disclosure, the reception section receives the uplink signal in the very first second sTTI positioned after an interval of a predetermined number of the first sTTIs from the transmission timing of the downlink signal.

In the base station of this disclosure, the reception section delays a reception timing of the uplink signal when a timing after the interval of the predetermined number of the first sTTIs from the transmission timing of the downlink signal does not match a boundary between the second TTIs.

In the base station of this disclosure, the downlink signal contains downlink assignment control information indicating assignment for a downlink data signal, and the reception section receives an ACK/NACK signal for the downlink data signal in the second sTTI positioned after the predetermined interval from a timing of the first sTTI in which the downlink data signal is transmitted.

In the base station of this disclosure, the downlink signal contains uplink assignment control information indicating assignment for the uplink signal, and the transmission section transmits an ACK/NACK signal for the uplink signal in the first sTTI positioned after the predetermined interval from a timing of the second sTTI in which the uplink signal is received.

In the base station of this disclosure, the first sTTI in which the uplink assignment control information is transmitted and the first sTTI in which the ACK/NACK signal is transmitted are different from each other.

In the base station of this disclosure, the transmission section transmits the ACK/NACK signal in the first sTTI right before the first sTTI in which the uplink assignment control information of an HARQ process ID identical to an HARQ process ID of the ACK/NACK signal is transmitted.

In the base station of this disclosure, the reception section receives, in a plurality of the second sTTIs within a single subframe, the ACK/NACK signal for each of a plurality of the downlink signals transmitted in a single subframe.

In the base station of this disclosure, the reception section receives the uplink signal in the very first second sTTI positioned after elapse of time obtained by adding an absolute time to an interval of a predetermined number of the first sTTIs from the transmission timing of the downlink signal.

In the base station of this disclosure, the reception section receives the uplink signal in the very first second sTTI positioned after elapse of a larger one of an interval of a predetermined number of the first sTTIs and an absolute time from the transmission timing of the downlink signal.

In the base station of this disclosure, the transmission section configures the predetermined interval based on a length of the first sTTIs forming a reference subframe, and when the first sTTI positioned before the predetermined interval from a timing at which the uplink signal is received is unavailable for signal assignment in a subframe having a smaller number of the first sTTIs available for signal assignment than the reference subframe, the transmission section transmits the downlink signal in the first sTTI positioned most rearward before the first sTTI which is unavailable for signal assignment.

In the base station of this disclosure, the downlink signal contains uplink assignment control information indicating assignment for the uplink signal, the transmission section configures the predetermined interval based on a length of the first sTTIs forming a reference subframe, and when the first sTTI positioned after the predetermined interval from a timing of the second sTTI in which the uplink signal is received is unavailable for signal assignment in a subframe having a smaller number of the first sTTIs available for signal assignment than the reference subframe, the transmission section transmits an ACK/NACK signal for the uplink signal in the very first first sTTI positioned after the first sTTI which is unavailable for signal assignment.

In the base station of this disclosure, the transmission section and the reception section use a common HARQ process ID when use of the first sTTI and the second sTTI is switched to use of the TTI.

A terminal of this disclosure includes: a reception section that receives a downlink signal using a first short transmission time interval (sTTI) shortened in length than a TTI and used for downlink; and a transmission section that transmits an uplink signal using a second sTTI shortened in length than the TTI and used for uplink, in which, when the first sTTI is shorter in length than the second sTTI, the transmission section transmits the uplink signal in the second sTTI positioned after a predetermined interval from a reception timing of the downlink signal, the predetermined interval being configured based on the length of the first sTTI.

A communication method of this disclosure includes: transmitting a downlink signal using a first short transmission time interval (sTTI) shortened in length than a TTI and used for downlink; and receiving an uplink signal using a second sTTI shortened in length than the TTI and used for uplink, in which, when the first sTTI is shorter in length than the second sTTI, the uplink signal is received in the second sTTI positioned after a predetermined interval from a transmission timing of the downlink signal, the predetermined interval being configured based on the length of the first sTTI.

A communication method of this disclosure includes: receiving a downlink signal using a first short transmission time interval (sTTI) shortened in length than a TTI and used for downlink; and transmitting an uplink signal using a second sTTI shortened in length than the TTI and used for uplink, in which, when the first sTTI is shorter in length than the second sTTI, the uplink signal is transmitted in the second sTTI positioned after a predetermined interval from a reception timing of the downlink signal, the predetermined interval being configured based on the length of the first sTTI.

INDUSTRIAL APPLICABILITY

An aspect of this disclosure is useful in mobile communication systems.

REFERENCE SIGNS LIST

100 Base station
101 sTTI determination section
102 sPDCCH generation section
103, 209 Error correction coding section
104, 210 Modulation section
105, 211 Signal assignment section
106, 212 Transmission section
107, 201 Reception section
108, 202 Signal demultiplexing section
109 ACK/NACK receiving section
110, 203 Demodulation section
111, 204 Error correction decoding section
112 ACK/NACK determination section
200 Terminal
205 sTTI configuration section
206 Error determination section
207 ACK/NACK generation section
208 sPDCCH receiving section The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A base station comprising:
a transmitter, which, in operation, transmits, to a terminal, a downlink signal in a first short transmission time interval (sTTI) that is shorter than a subframe; and
a receiver, which, in operation, receives an uplink signal transmitted from the terminal in a second sTTI after a determined number of first sTTIs from a transmission timing of the downlink signal, the second sTTI being shorter than the subframe and longer than the first sTTI,
wherein the receiver, in operation, receives the uplink signal transmitted in the second sTTI that first occurs after the determined number of first sTTIs from the transmission timing of the downlink signal when a timing just after the determined number of first sTTIs from the transmission timing of the downlink signal does not match a boundary between second sTTIs.

2. The base station according to claim 1, wherein the downlink signal includes downlink control information indicating an assignment of downlink data, and the uplink signal is an ACK/NACK signal for the downlink data.

3. The base station according to claim 1, wherein the downlink signal includes downlink control information indicating an assignment of the uplink signal, and the transmitter, in operation, transmits an ACK/NACK signal for the uplink signal in the first sTTI after a determined number of first sTTIs from the second sTTI in which the uplink signal is received.

4. The base station according to claim 3, wherein the transmitter, in operation, transmits the ACK/NACK signal in the first sTTI just before the first sTTI in which the downlink control information of an HARQ process ID identical to an HARQ process ID of the ACK/NACK signal is transmitted.

5. The base station according to claim 1, wherein the receiver, in operation, receives the uplink signal transmitted from the terminal in the second sTTI after the determined number of first sTTIs and an absolute time from the transmission timing of the downlink signal.

6. The base station according to claim 1, wherein the receiver, in operation, receives the uplink signal transmitted from the terminal in the second sTTI after a larger one of the determined number of first sTTIs and an absolute time from the transmission timing of the downlink signal.

7. The base station according to claim 1, wherein the transmitter and the receiver, in operation, use a common HARQ process ID or keep a HARQ process ID in switching between sTTI and TTI that is the subframe.

8. The base station according to claim 1, wherein the determined number is configured as a variable parameter between the base station and terminal.

9. The base station according to claim 1, wherein the determined number is applied to all of the first sTTIs of the subframe.

10. A communication method comprising:
transmitting, to a terminal, a downlink signal in a first short transmission time interval (sTTI) that is shorter than a subframe; and
receiving an uplink signal transmitted from the terminal in a second sTTI after a determined number of first sTTIs from a transmission timing of the downlink signal, the second sTTI being shorter than the subframe and longer than the first sTTI,
wherein the receiving includes receiving the uplink signal transmitted in the second sTTI that first occurs after the determined number of first sTTIs from the transmission timing of the downlink signal when a timing just after the determined number of first sTTIs from the transmission timing of the downlink signal does not match a boundary between second sTTIs.

11. The communication method according to claim 10, wherein the downlink signal includes downlink control information indicating an assignment of downlink data, and the uplink signal is an ACK/NACK signal for the downlink data.

12. The communication method according to claim 10, wherein the downlink signal includes downlink control information indicating an assignment of the uplink signal, and the transmitting includes transmitting an ACK/NACK signal for the uplink signal in the first sTTI after a determined number of first sTTIs from the second sTTI in which the uplink signal is received.

13. The communication method according to claim 12, wherein the transmitting includes transmitting the ACK/NACK signal in the first sTTI just before the first sTTI in which the downlink control information of an HARQ process ID identical to an HARQ process ID of the ACK/NACK signal is transmitted.

14. The communication method according to claim 10, wherein the receiving includes receiving the uplink signal transmitted from the terminal in the second sTTI after the determined number of first sTTIs and an absolute time from the transmission timing of the downlink signal.

15. The communication method according to claim 10, wherein the receiving includes receiving the uplink signal transmitted from the terminal in the second sTTI after a larger one of the determined number of first sTTIs and an absolute time from the transmission timing of the downlink signal.

16. The communication method according to claim 10, wherein a common HARQ process ID is used or a HARQ process ID is kept in switching between sTTI and TTI that is the subframe.

17. The communication method according to claim 10, wherein the determined number is configured as a variable parameter.

18. The communication method according to claim 10, wherein the determined number is applied to all of the first sTTIs of the subframe.

* * * * *